United States Patent
Vuksa et al.

(10) Patent No.: US 8,668,623 B2
(45) Date of Patent: Mar. 11, 2014

(54) ENGINE BRAKING PRIMARY CLUTCH FOR CVT SYSTEMS

(75) Inventors: Zoran Vuksa, Grand Forks, ND (US); Bruce A. Nelson, Bagley, MN (US); Shane C. Okeson, Bagley, MN (US)

(73) Assignee: TEAM Industries, Inc., Bagley, MN (US)

( * ) Notice: Subject to any disclaimer, the term of this patent is extended or adjusted under 35 U.S.C. 154(b) by 818 days.

(21) Appl. No.: 12/794,734

(22) Filed: Jun. 5, 2010

(65) Prior Publication Data

US 2011/0092325 A1   Apr. 21, 2011

Related U.S. Application Data

(60) Provisional application No. 61/252,010, filed on Oct. 15, 2009.

(51) Int. Cl.
*B60W 10/00* (2006.01)

(52) U.S. Cl.
USPC .............................................. 477/80; 477/174

(58) Field of Classification Search
USPC ................... 477/70, 74, 77, 79, 80, 166, 174; 474/17–21, 46
See application file for complete search history.

(56) References Cited

U.S. PATENT DOCUMENTS

| | | |
|---|---|---|
| 2,521,457 A | 9/1950 | Heyer |
| 3,195,364 A | 7/1965 | Pauli |
| 3,698,828 A | 10/1972 | Maus et al. |
| 3,757,593 A | 9/1973 | Svenson |
| 3,916,707 A | 11/1975 | Wells |
| 3,939,720 A | 2/1976 | Aaen et al. |
| 3,996,811 A | 12/1976 | Reese |
| 4,027,544 A | 6/1977 | Kobayashi |
| 4,196,641 A | 4/1980 | Vogel |
| 4,380,444 A | 4/1983 | Dolza |
| 4,523,917 A | 6/1985 | Schildt |

(Continued)

FOREIGN PATENT DOCUMENTS

| | | |
|---|---|---|
| JP | 1-279154 | 11/1989 |
| WO | WO 2008/148208 A1 | 12/2008 |

OTHER PUBLICATIONS

International Search Report from Serial No. PCT/US2010/050503 mailed Nov. 19, 2010.

(Continued)

*Primary Examiner* — Justin Holmes
(74) *Attorney, Agent, or Firm* — IPLM Group, P.A.

(57) ABSTRACT

A continuously variable transmission (CVT) system including a primary clutch assembly with an engine braking assembly is provided. The primary clutch assembly includes first and second sheave assemblies, a cylindrical sleeve coupler and an engine braking assembly. The first sheave portion has a centrally extending post. The cylindrical sleeve coupler is rotationally mounted on a portion of the post. The sleeve coupler has an engaging surface that is configured to engage an inner face of a drive belt. The second sheave portion has a central passage that is rotationally mounted on the sleeve coupler. The engine braking assembly is operatively coupled to the second sheave portion and the sleeve coupler to axially move the second sheave portion toward the first sheave portion to engage first and second side faces of the drive belt when the sleeve coupler attempts to overrun the post of the first sheave portion in a rotational direction provided by a rotational output of an engine operatively coupled to the primary clutch.

17 Claims, 22 Drawing Sheets

(56) References Cited

U.S. PATENT DOCUMENTS

| | | | |
|---|---|---|---|
| 4,585,429 A | 4/1986 | Marier | |
| 4,611,702 A | 9/1986 | Kayakabe et al. | |
| 4,969,856 A | 11/1990 | Miyata et al. | |
| 5,209,703 A | 5/1993 | Mastine et al. | |
| 5,254,041 A | 10/1993 | Duclo | |
| 5,326,330 A | 7/1994 | Bostelmann | |
| 5,341,698 A | 8/1994 | Tseng | |
| 5,421,784 A | 6/1995 | Robert | |
| 5,460,575 A | 10/1995 | Berto | |
| 5,516,333 A | 5/1996 | Benson | |
| 5,562,555 A | 10/1996 | Peterson | |
| 5,580,324 A | 12/1996 | Landry | |
| 5,647,810 A | 7/1997 | Huddleston | |
| 5,692,982 A | 12/1997 | Peterson | |
| 5,720,681 A | 2/1998 | Benson | |
| 5,906,258 A | 5/1999 | Kimura et al. | |
| 5,967,286 A | 10/1999 | Hokanson et al. | |
| 6,039,163 A | 3/2000 | Bassett et al. | |
| 6,120,399 A | 9/2000 | Okeson et al. | |
| 6,146,295 A | 11/2000 | Mor et al. | |
| 6,149,540 A | 11/2000 | Johnson et al. | |
| 6,354,419 B1 | 3/2002 | Dalbiez et al. | |
| 6,379,274 B1 | 4/2002 | Robert | |
| 6,569,043 B2 | 5/2003 | Younggren et al. | |
| 6,743,129 B1 | 6/2004 | Younggren et al. | |
| 6,837,353 B2 | 1/2005 | Watt | |
| 6,896,087 B2 * | 5/2005 | Korenjak et al. | 180/292 |
| 7,081,057 B2 | 7/2006 | Kalies | |
| 7,614,970 B2 | 11/2009 | Teijido et al. | |
| 8,100,791 B2 | 1/2012 | Yamaguchi et al. | |
| 2002/0033295 A1 | 3/2002 | Korenjak et al. | |
| 2002/0065156 A1 | 5/2002 | Younggren et al. | |
| 2002/0065157 A1 | 5/2002 | Heinrich et al. | |
| 2002/0119846 A1 * | 8/2002 | Kitai et al. | 474/14 |
| 2002/0123400 A1 | 9/2002 | Younggren et al. | |
| 2004/0185973 A1 * | 9/2004 | Sato et al. | 474/8 |
| 2004/0185974 A1 | 9/2004 | Labbe | |
| 2008/0102997 A1 | 5/2008 | Ho | |
| 2012/0065022 A1 * | 3/2012 | Ohashi et al. | 477/77 |

OTHER PUBLICATIONS

Non-Final Office Action mailed Mar. 13, 2012 for U.S. Appl. No. 12/722,919.

European Search Report of European Patent Application No. EP10823820.5 mailed Mar. 22, 2013, 5 pages.

"Found, the Missing Half of the Secondary Clutch". New SnowTech Magazine. Sep. 1997, pp. 114-119.

European Search Report of European Patent Application No. EP11753733.2 mailed Jun. 19, 2013, 8 pages.

* cited by examiner

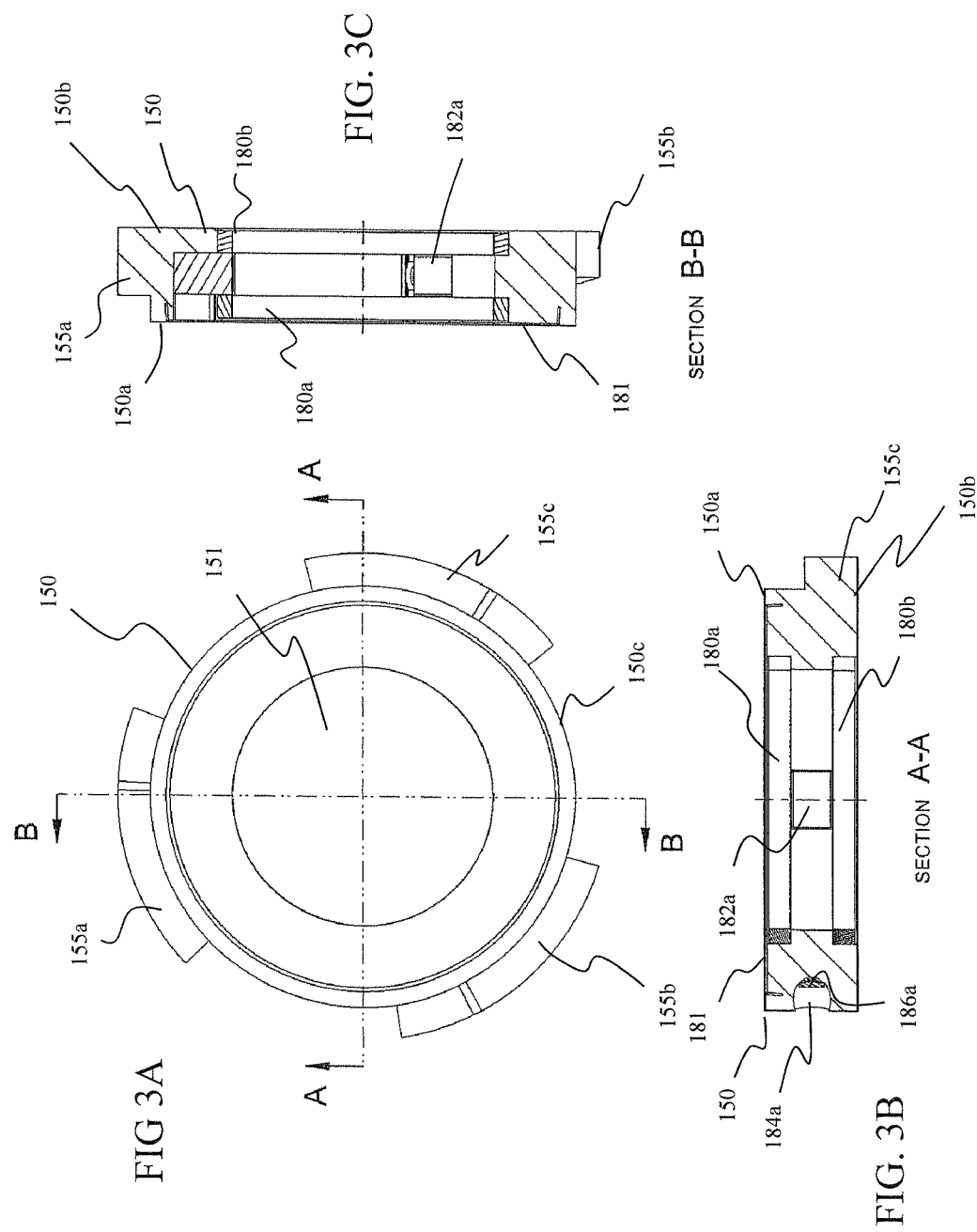

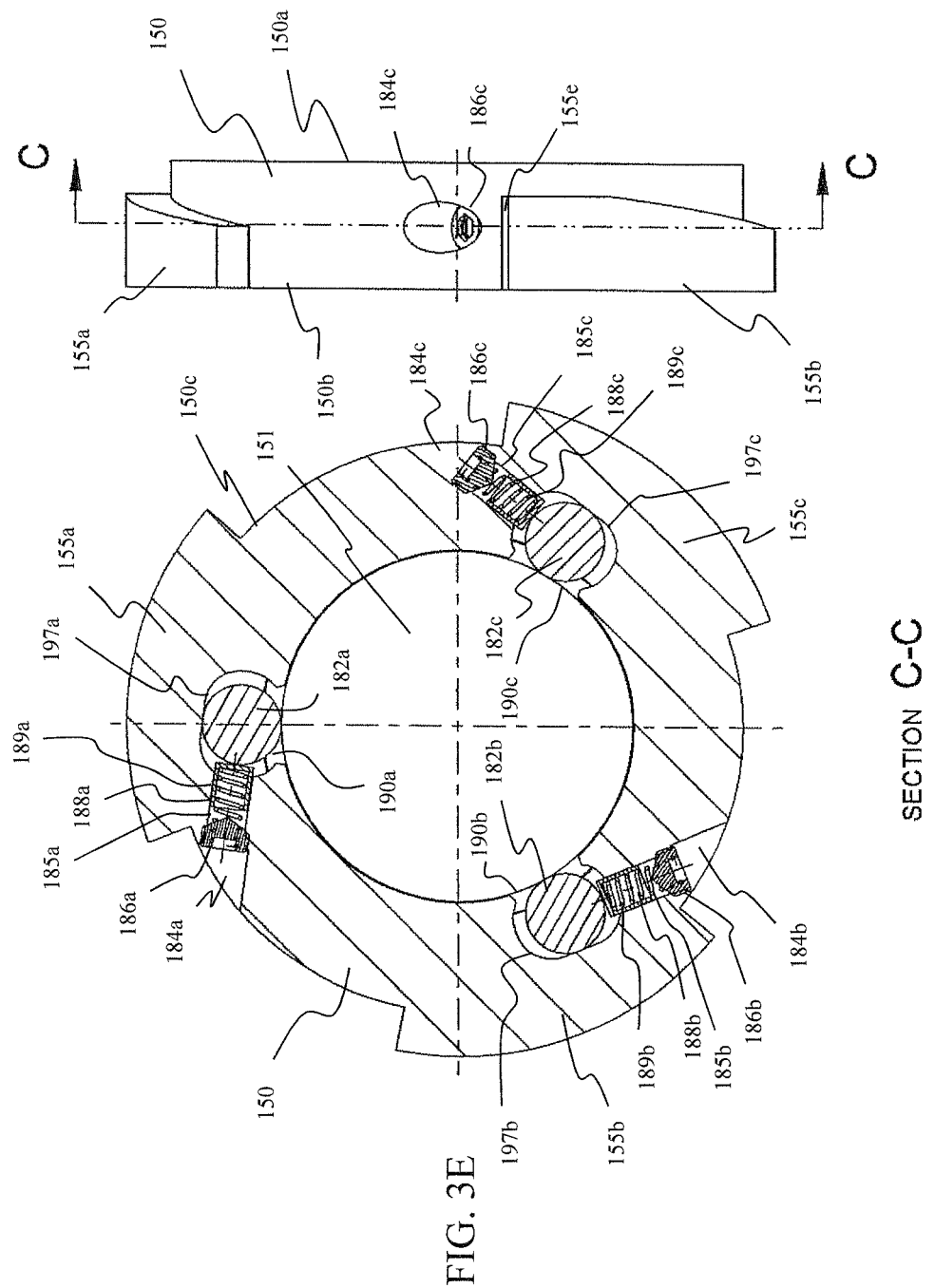

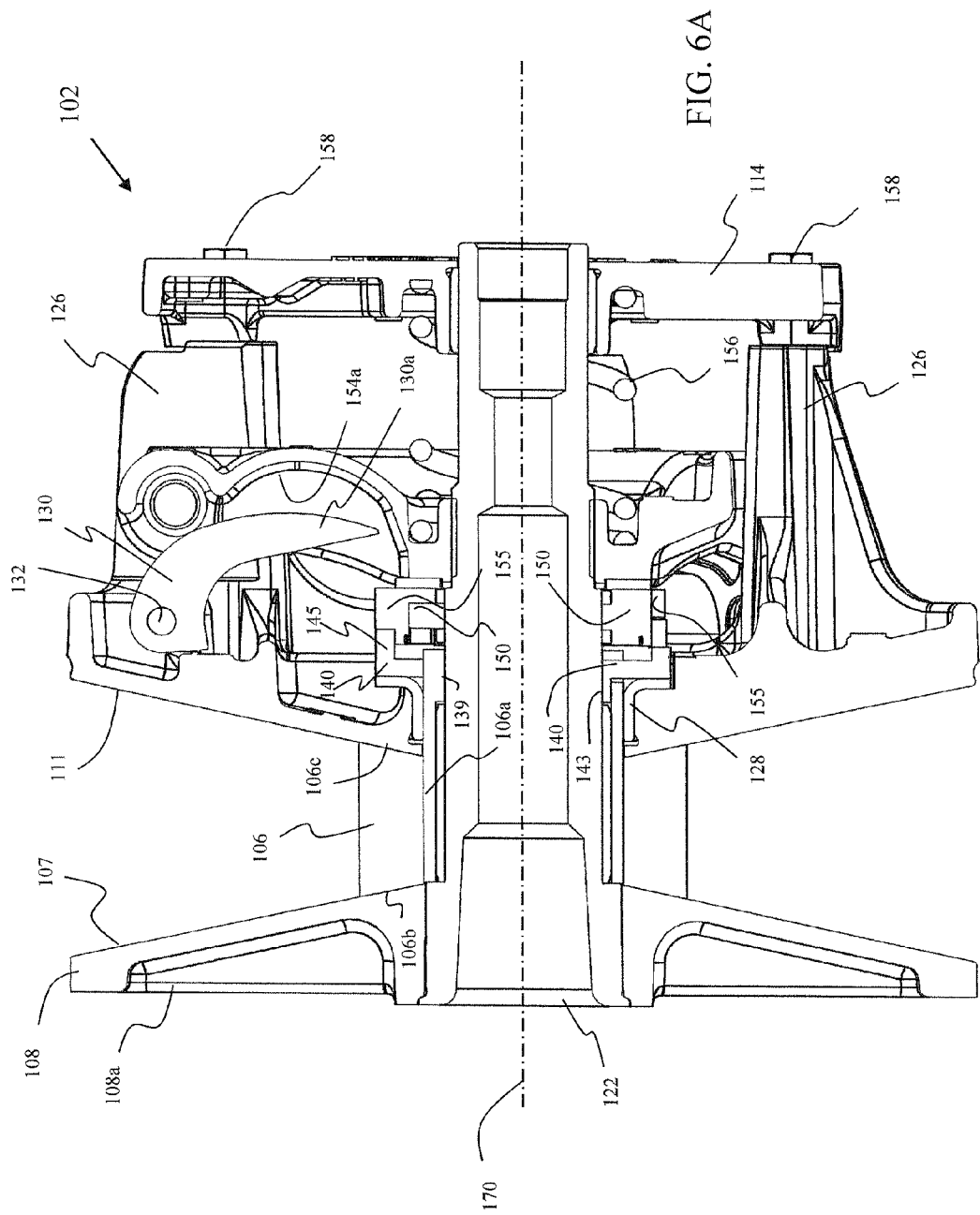

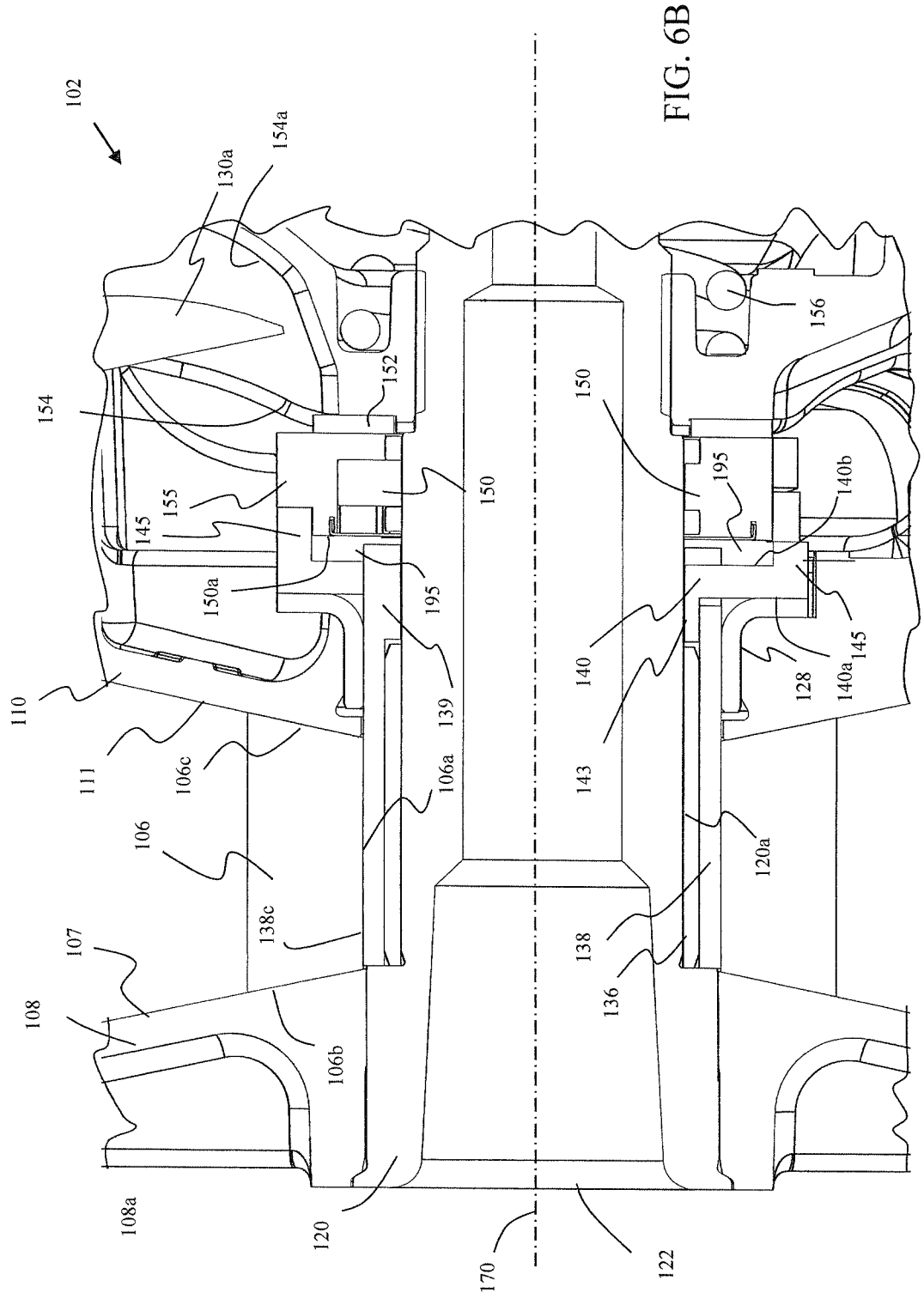

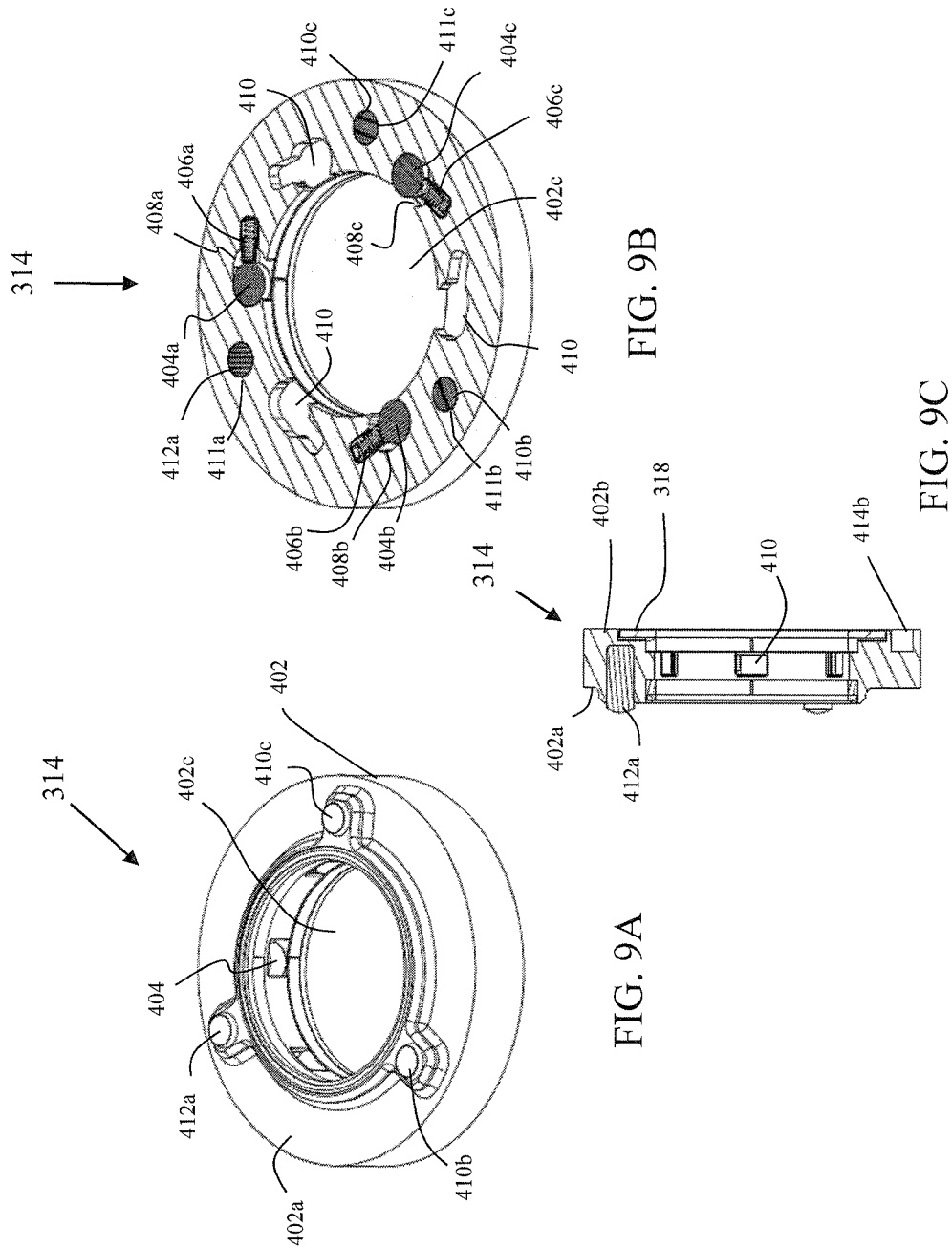

ENGINE BRAKING PRIMARY CLUTCH FOR CVT SYSTEMS

CROSS-REFERENCE TO RELATED APPLICATIONS

This Application claims priority to U.S. Provisional Application Ser. No. 61/252,010, same title herewith, filed on Oct. 15, 2009, which is incorporated in its entirety herein by reference.

BACKGROUND

Continuously variable transmission (CVT) systems are used in vehicles to change transmission ratios between an engine output and a drive train of the vehicle. In a typical CVT system, a primary clutch is coupled to receive a rotational output from an engine and a secondary clutch is coupled to provide a rotational output to the drive train. The primary clutch is coupled to provide rotation to the secondary clutch with an endless loop drive belt. In changing transmission ratios, typically the primary clutch is comprised of first and second conical-faced sheave portions that are configured in a way to move the second conical-faced sheave portion axially in relation to the first conical-faced sheave portion along an axis of rotation. In this system the distance between the sheaves of the primary clutch determines the positioning of the drive belt in relation to the rotational axis and hence the transmission ratio. In particular, the closer the first and second sheave portions are positioned together, the farther the drive belt is pinched on the conical-faces away from the rotational axis of the primary clutch. Likewise, the farther the first and second sheave portions are positioned away from each other, the closer the drive belt is the rotational axis of the primary clutch. When the engine is at idle speeds, the first and second sheaves of the primary clutch are axially positioned at a select distance from each other so at least one of the conical faced sheave portions does not engage a side of the drive belt. In this situation, the limited friction between the drive belt and the primary clutch allows the belt to slip so no rotational force is applied to the secondary sheave and hence no power is provided to the drive train by the engine.

Typically CVT systems as described above do not allow for engine braking. Engine braking is a term used to describe when the engine of a vehicle is used to provide at least some of the braking for the vehicle. An example situation where engine braking is beneficial occurs when a vehicle is going down a steep incline and the operator cuts back on the throttle. In this situation the engine's rotational output will be slower than the rotation of the drive train. In an engine braking scheme, the slow rotation of the engine is used to slow down the rotation of the drive train. However, since the drive belt on a typical CVT system is designed to slip on the primary clutch during idle speeds of the motor, the engine effectively is disconnected from the drive train. This disconnection between the engine and the drive train prevents a typical CVT system from implementing engine braking. In this situation, other traditional braking means must be employed which may or may not be effective in a given situation.

For the reasons stated above and for other reasons stated below which will become apparent to those skilled in the art upon reading and understanding the present specification, there is a need in the art for an efficient and effective engine braking mechanism in a CVT system.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a primary clutch assembly of a CVT system is provided. The primary clutch assembly includes first and second sheave assemblies, a cylindrical sleeve coupler and an engine braking assembly. The first sheave portion has a first conical-faced surface. The first conical-faced surface is configured to engage a first side face of a drive belt. The first sheave portion further has a post that centrally extends from the first conical-faced surface. The cylindrical sleeve coupler is rotationally mounted on a portion of the post proximate the first conical-faced surface. The sleeve coupler has an engaging surface that is configured to engage an inner face of the drive belt. The second sheave portion has a central passage that is rotationally mounted on the sleeve coupler. The second sheave portion has a second conical-faced surface positioned to face the first conical-faced surface of the first sheave portion. Moreover, the second conical-faced surface is configured to engage a second side face of the drive belt. The engine braking assembly is operatively coupled to the second sheave portion and the sleeve coupler to axially move the second sheave portion toward the first sheave portion to engage the first conical-faced surface of the first sheave portion with the first side face of the drive belt and the second conical-faced surface of the second sheave portion with the second side face of the drive belt when the sleeve coupler attempts to overrun the post of the first sheave portion in a rotational direction provided by a rotational output of an engine operatively coupled to the primary clutch.

BRIEF DESCRIPTION OF THE DRAWINGS

The present invention can be more easily understood and further advantages and uses thereof more readily apparent, when considered in view of the detailed description and the following figures in which:

FIG. 3A is a top view of one way clutch (OWC) of one embodiment of the present invention;

FIG. 3B is a cross-sectional view along section line AA of the OWC of FIG. 3A;

FIG. 3C is a cross-sectional view along section line BB of the OWC of FIG. 3A;

FIG. 3D is a side-view of the OWC of FIG. 3A;

FIG. 3E is a cross-sectional view of the OWC along section line CC of FIG. 3D;

FIG. 6A is a side cross-sectional view of a primary clutch with a drive belt in an engine braking position of one embodiment of the present invention;

FIG. 6B is a close up side cross-sectional view of a portion of the primary clutch of FIG. 6A;

FIG. 9A is a top perspective view of a OWC of another embodiment of the present invention;

FIG. 9B is a cross-sectional top view of the OWC of FIG. 9A;

FIG. 9C is a cross-sectional side view of the OWC of FIG. 9A;

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which are shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide an effective engine braking mechanism that engages three surfaces of a drive belt during situations where a secondary clutch has a faster rotational speed than a primary clutch. In embodiments, an engine braking assembly moves a second sheave portion towards a first sheave portion of a primary clutch to engage the drive belt as described above in response to a sleeve coupler of the engine braking assembly (which is driven by the drive belt) attempting to overrun, in a rotational direction, a post of the first sheave portion that is driven by a rotational output of an engine operatively coupled to the primary clutch.

Figure 1:
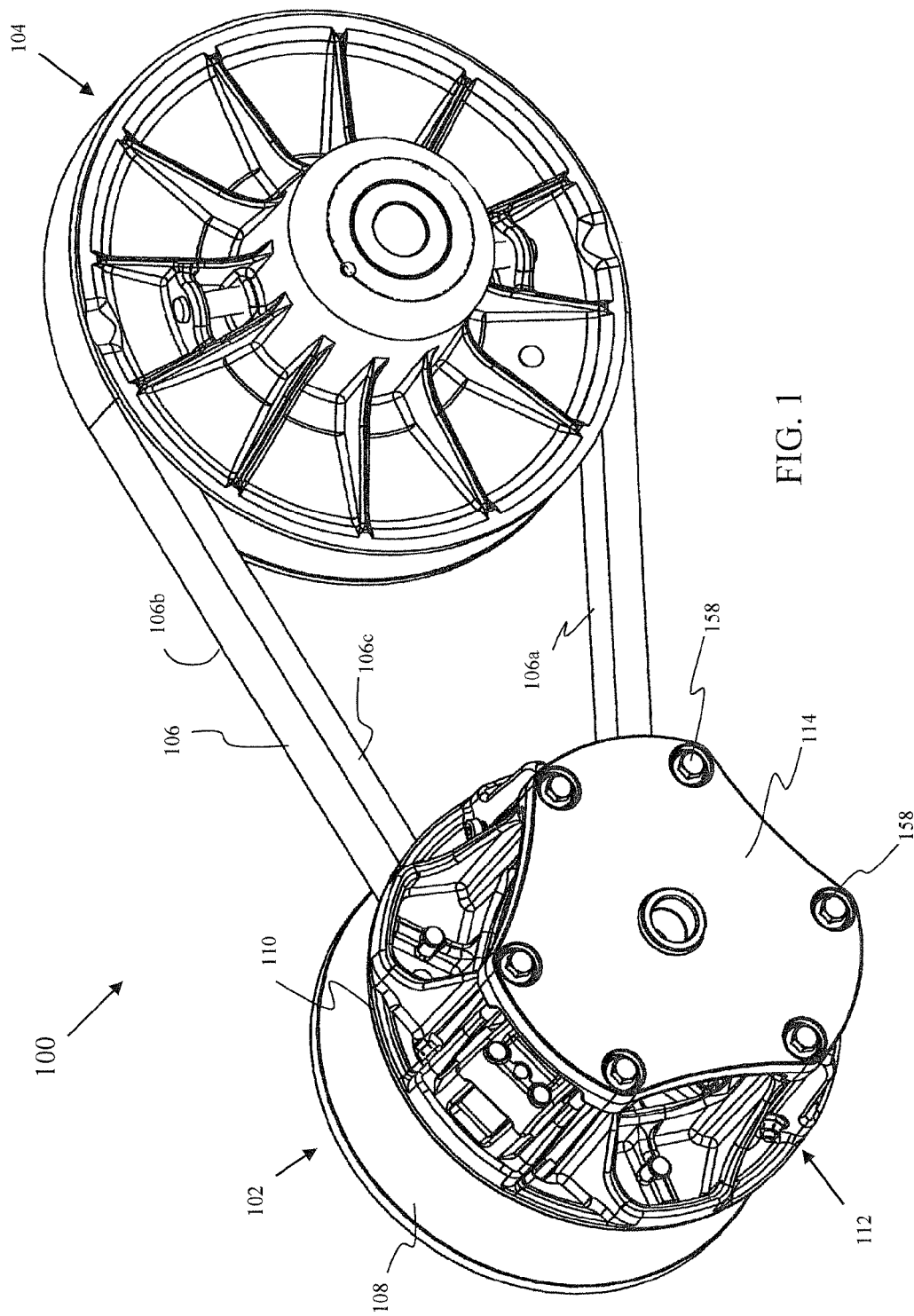
FIG. 1 is a side perspective view of a CVT system of one embodiment of the present invention.

Referring to FIG. 1, a side perspective view of a CVT system 100 of an embodiment is illustrated. As illustrated, the CVT system 100 includes a primary clutch 102 and a secondary clutch 104. The primary clutch 102 is coupled to receive a rotational output from an engine (not shown). The secondary clutch provides a rotational output to a drive train (not shown). An endless looped drive belt 106 rotationally couples the primary clutch 102 and the secondary clutch 104. The primary clutch 102 includes a first sheave portion 108 and a second sheave portion 110. In this embodiment, the second sheave portion 110 is axially movable in relation to the first sheave portion 108. In particular, a sheave moving assembly 112 of the primary clutch 102 is designed to selectively move the second sheave portion 110 in relation to the first sheave portion 108. Further illustrated in FIG. 1, is a cover 114 and fasteners 158 that attach the cover 114 to the second sheave portion 110.

Figure 2A:
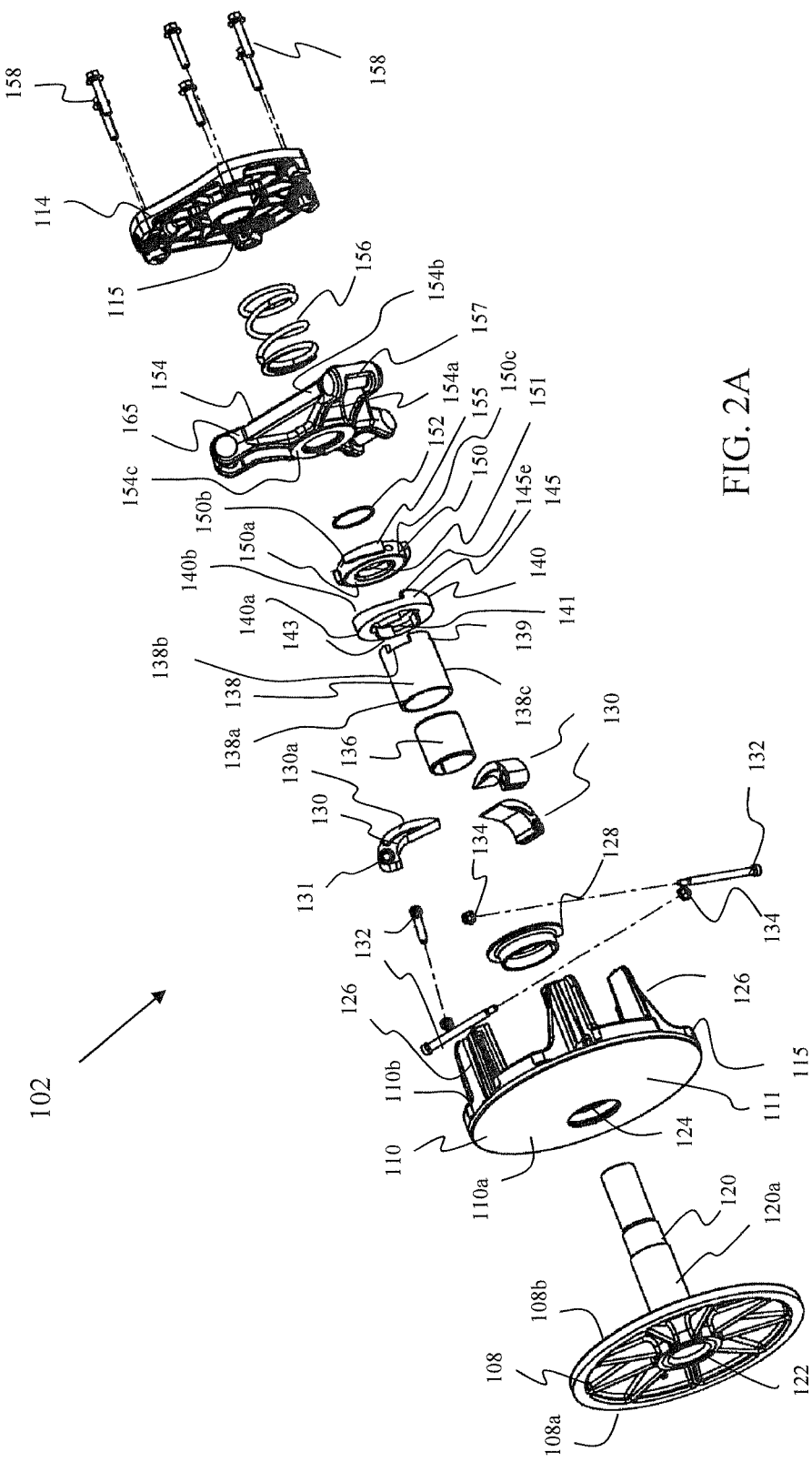
FIG. 2A is an unassembled side perspective view of a primary clutch of one embodiment of the present invention.
Figure 2B:
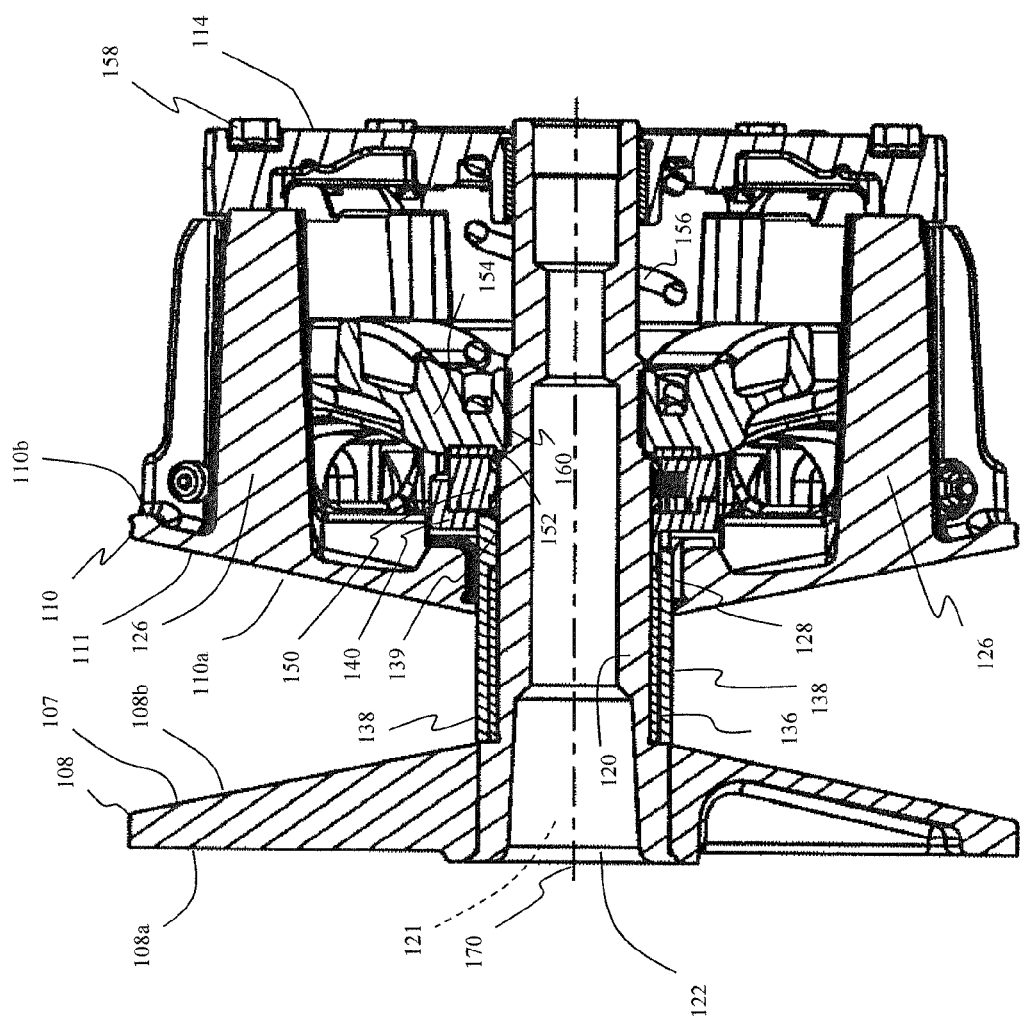
FIG. 2B is an assembled cross-sectional side view of the primary clutch of FIG. 2A.

FIGS. 2A and 2B illustrate a primary clutch 102 of one embodiment. In particular, FIG. 2A illustrates an unassembled side perspective view of the primary clutch 102 and FIG. 2B illustrates an assembled cross-sectional side view of the primary clutch 102. As FIGS. 2A and 2B illustrate, the primary clutch 102 includes the first sheave portion 108 and the second sheave portion 110. The first sheave portion 108 includes a first side 108a and second side 108b. The first side 108a of the first sheave portion 108 includes a central opening 122. The second side 108b of the first sheave portion 108 includes a first conical-faced surface 107 designed to engage a first side face 106b of a drive belt 106. The first sheave portion 108 further includes a post 120 that centrally extends from the first conical-faced surface 107. The post 120 includes a bore 121 centered about a rotational axis 170 of the primary clutch 102 as illustrated in FIG. 2B. The bore 121 is further aligned with the central opening 122. Bore 121 is designed to receive a rotational output from an engine (not shown). For example, in one embodiment bore 121 is designed to engage a crankshaft (not shown) of an engine that is passed through the central opening 122. In other embodiments, other mechanisms provide the rotational output of the engine to the primary clutch 102. The first sheave portion 108 and the post 120 rotate in response to the rotational output of the engine.

A bearing 136 is received around a portion of the post 120. In one embodiment, bearing 136 is a cylindrical bearing. In other embodiments other types of bearings are used including, but not limited to, roller element bearings, plain bearings and the like. A cylindrical sleeve coupler 138 is further received around bearing 136 so that bearing 136 is positioned between the sleeve coupler 138 and a surface 120a of the post 120. The sleeve coupler 138 in this embodiment has an engaging surface 138c designed to engage an inner face 106a of a drive belt 106. The sleeve coupler 138 further includes a first end 138a and a second end 138b. The first end 138a is positioned proximate the first conical faced surface 107 of the first sheave portion 108. The second end 138b of the sleeve coupler 138 includes a plurality of sleeve coupler dogs 139.

The second sheave portion 110 of the primary clutch 102 includes a first side 110a and a second side 110b. The first side 110a of the second sheave portion 110 includes a second conical-faced surface 111. The second conical-faced surface 111 is designed to engage a second side face 106c of a drive belt 106. The second sheave portion 110 further includes a central sheave passage 124. The central sheave passage 124 is received around the sleeve coupler 138 such that the first conical-faced surface 107 of the first sheave portion 108 faces the second conical-faced surface 111 of the second sheave portion 110. A bushing 128 is positioned between a portion of a surface that defines opening 124 of the second sheave portion 110 and the sleeve coupler 138. In one embodiment, bushing 128 is any type of plain bearing. The second sheave portion 110 further has a plurality of arm extending portions 126 (bosses) that extend out generally perpendicular proximate an outer perimeter 115 of the second side 110b of the second sheave portion.

The primary clutch 102 further includes a ramp coupler 140. The ramp coupler 140 has a first side 140a and a second side 140b and a central ramp coupler passage 141. The central ramp coupler passage 141 is received around a portion of the post 120 of the first sheave portion 108. The first side 140a of the ramp coupler has a plurality of ramp coupler dogs 143 configured to mate with the sleeve coupler dogs 139 of the sleeve coupler 138 to provide a rotational coupling between the ramp coupler 140 and the sleeve coupler 138. The second end 140b of the ramp coupler 140 includes at least one coupler ramp 145. The primary clutch 102 further includes a one way clutch 150 (OWC) that has a central roller clutch passage 151. The central roller clutch passage 151 is received around a portion of the post 120 of the first sheave portion 108. The OWC 150 includes a first side 150a, a second side 150b and outer perimeter 150c. The OWC 150 further includes at least one clutch ramp 155 that extends radially out from a surface that defines the outer perimeter 150c. In another embodiment (not shown), the at least one clutch ramp 155 extends axially. In still another embodiment (not shown) the OWC includes at least one follower and at least one clutch ramp 155. The at least one clutch ramp 155 is positioned to selectively engage the at least one coupler ramp 145 of the ramp coupler 140. Movement of the at least one clutch ramp 155 of the OWC 150 in relation to the at least one coupler ramp 145 of the ramp coupler 140 provides engine braking functions as further discussed in detail below.

Cover 114, as briefly discussed above, includes a central cover opening 115. The central cover opening 115 receives an end of the post 120 of the first sheave portion 108. The cover 114 has a plurality of apertures that align with threaded bores (not shown) in the arm extending portions 126 (bosses) of the second sheave portion 110. Fasteners 158, such as bolts, are passed through the plurality of the apertures in the cover 114 and are threadably engaged with the threaded bores in the arm extending portions 126 of the second sheave portion 110. The primary clutch 102 also includes a spider 154. The spider 154 includes a first side 154a, a second side 154b and a central spider passage 153. The central spider passage 153 is received around and coupled to a portion of the post 120 of the first sheave portion 108. In particular, the spider 154 is solidly coupled about connection 160 as illustrated in FIG. 2B. In one embodiment, the connection 160 is mated threads. This connection 160 keeps the spider 154 static in relation to the post 120 thereby preventing the spider 154 from moving axially along the axis of rotation 170. The spider 154 is positioned between the cover 114 and the second sheave portion 110 as illustrated. The spider 154 further includes radially extending arms 165. Each radially extending arm 165 holds an engaging pin/roller subassembly 157. A washer 152 is positioned between the second side 150b of the OWC 150 and surface 154c of the first side 154a of the spider 154. A biasing member 156 is positioned between the second side 154b of the spider 154 and the cover 114. The biasing member 156, which in this embodiment is a spring, provides a biasing force separating the spider from the cover 114. Moreover, since the second sheave portion 110 is coupled to the cover 114 via fasteners 158, the biasing force of the biasing member 156 forces the second sheave portion 110 away from the first sheave portion 108 and towards the spider 154.

A plurality of flyweight members 130 are rotationally coupled the second side 110b of the second sheave portion 110. In particular, in this embodiment each flyweight 130 has a flyweight passage 131 that is rotationally mounted on a pivot rod 132. Each pivot rod 132 is coupled to the second sheave portion 110 via connector 134. The plurality of the flyweights 130 are designed to pivot on the pivot rod 132 such that an engaging surface 130a of the flyweights 130 moves towards the first side 154a of the spider 154 in response to select angular rotational speeds of the second sheave portion 110. In particular, a centrifugal force created by the rotation of the second sheave portion 110 causes the flyweights 130 to pivot about pivot rods 132 causing the engaging surfaces 130a of the flyweights 130 to push on the engaging pin/roller subassemblies 157 of spider 154. The faster the rotation of the second sheave portion 110, the more push force the flyweights 130 exert on the spider 154. This push force counters the biasing force created by biasing member 156 thereby moving the second sheave portion 110 closer to the first sheave portion 108 and away from the spider 154. During acceleration of the rotation of the CVT 100, the movement of second sheave portion 110 toward the first sheave portion 108 causes the drive belt 106 to move farther away from the rotation axis 170 of the primary clutch 102 thereby changing into higher gearing of the CVT 100. During de-acceleration of the rotation of the CVT 100 (where the biasing force becomes greater than the push force), the movement of second sheave portion 110 away from the first sheave portion 108 causes the drive belt 106 to move closer to the rotation axis 170 of the primary clutch 102 thereby changing into lower gearing of the CVT 100. This is further discussed below in regards to FIGS. 5A and 5B. Although, a sheave moving member based on the rotational speed of the sheave implementing flyweights is described above, other types of the sheave moving members know in the art are contemplated and the present invention is not limited to flyweight systems.

As discussed above, embodiments of the present invention implement engine braking. In an engine braking situation, the second sheave portion 110 is not rotating fast enough for the push force of the flyweights 130 to counter the biasing force of the biasing member 156. In embodiments however, during an engine braking situation, as the inner surface 106a of drive belt contacts the engaging surface 138c of the sleeve coupler 138, the ramp coupler 140 and the OWC 150 work together to counter the biasing force of biasing member 156. This causes the second sheave portion 110 to move towards the first sheave portion 108 so that the first conical-faced surface 107 of the first sheave portion 108 engages the first side face 106b of the drive belt 106 and the second conical-faced surface 111 of the second sheave portion 110 engages the second side face 106c of the drive belt 106. The friction created between the drive belt 106 and the first and second conical-faced surfaces 107 and 111 and surface 138c of the sleeve coupler 138 allow the engine to help slow down the vehicle. Further description of the engine braking mechanism is described below in regards to FIGS. 6A and 6B.

Figure 3F:
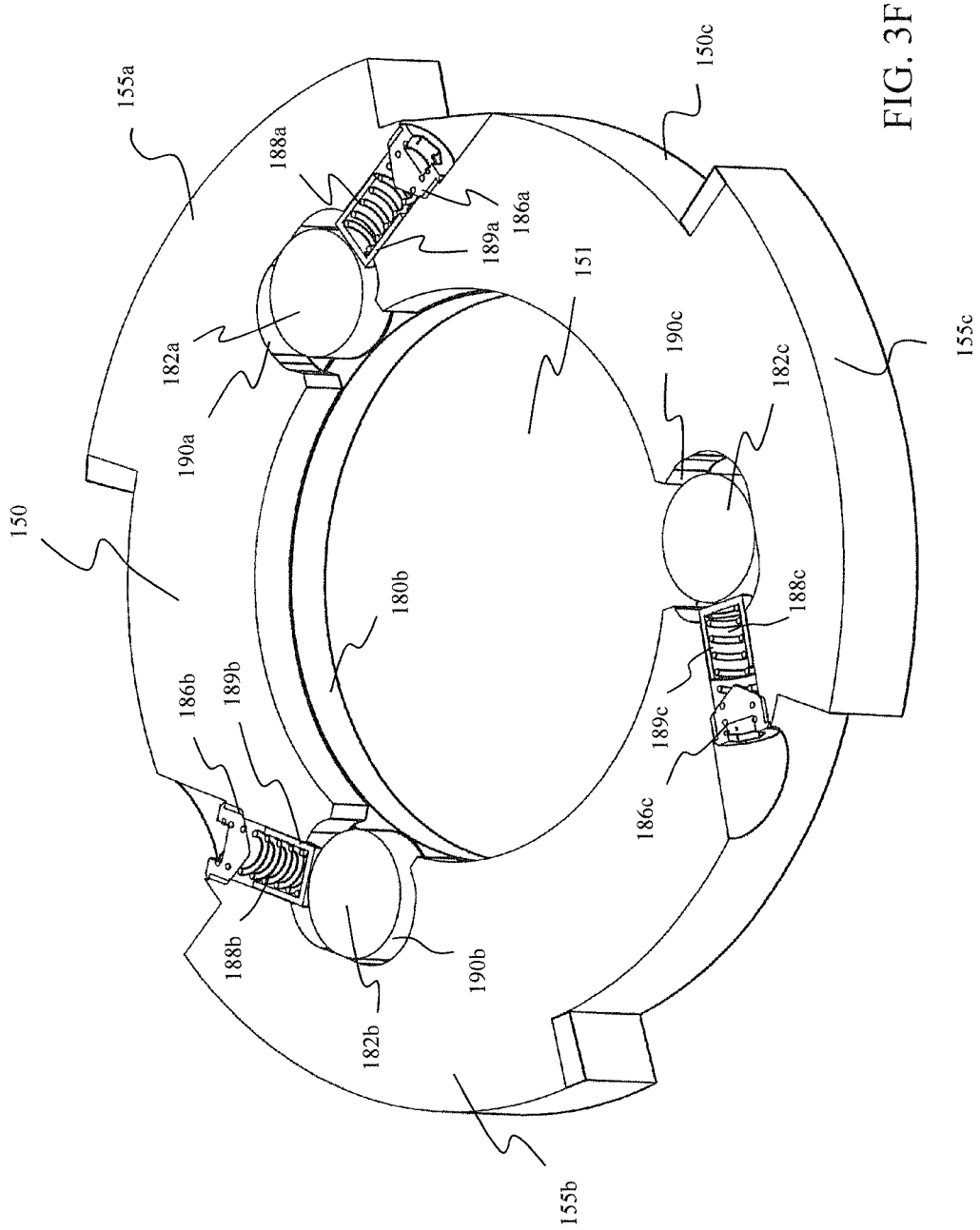
FIG. 3F is a cross-sectional side perspective view of the OWC of FIG. 3A.

As further discussed above, one of the devices used in embodiments of the engine braking mechanism is the OWC 150. An illustration of an embodiment of an OWC 150 is provided in FIGS. 3A through 3D. In particular, FIG. 3A illustrates a top view of OWC 150. As illustrated, the OWC 150 has a body that is generally ring shaped having an outer perimeter 150c and a central passage 151. As discussed above, the central clutch passage 151 is received around surface portion 120a of post 120 of the first sheave portion 108. This embodiment of the OWC 150 includes a plurality of clutch ramps designated as 155a, 155b and 155c (moving members). Ramps 155a, 155b and 155c in this embodiment generally extend radially outward from a surface that defines the outer perimeter 150c of the OWC 150. In another embodiment (not shown) the ramps extend forward axially. Hence, the direction of the clutch ramps 155a, 155b and 155c is not limited to extending radially. In a corresponding embodiment of the ramp coupler 140, the ramp coupler 140 has three coupler ramps 145 to respectively engage the three clutch ramps 155a, 155b and 155c. As illustrated in the cross-sectional views along section line AA and along section line BB of the embodiment in FIGS. 3B and 3C, the OWC 150 includes pin roller 182a that is positioned between a first plain bearing 180a and a second plain bearing 180b. The plain bearings 180a and 180b are pressed into their respective positions. In other embodiments, other types of bearings are used. A cover 181 is positioned on the first side 150a of the OWC 150 to keep dust out of the OWC 150. A set screw opening 184a provides access to a set screw 186a. Set screw opening 184c and set screw 186c is further illustrated in the side view of the OWC 150 of FIG. 3D. FIG. 3D further illustrates the shape of ramps 155a and 155b in this embodiment. As illustrated the clutch ramps 155a, 155b and 155c include a flat section 155e. The clutch flat section 155e engages a corresponding flat section on a corresponding coupler ramp 145 of a ramp coupler 140 in an overrunning mode described further below.

A cross-sectional view along section line CC of FIG. 3D is illustrated in FIG. 3E. FIG. 3E further illustrates set screws 186a, 186b and 186c. As illustrated, each set screw 186a, 186b and 186c has an associated opening 184a, 184b and 184c that allow access to the respective set screws 186a, 186b and 186c that are threadably engaged with internal threads of respective biasing member passages 185a, 185b and 185c. The set screw passages 185a, 185b and 185c extend from the outer perimeter 150c of the OWC 150 to the associated internal cavities 190a, 190b and 190c. The set screws 186a, 186b and 186c are each respectively engaged with pin roller biasing members 188a, 188b and 188c. The biasing members 188a, 188b and 188c are received in respective plungers 189a, 189b and 189c. The plungers 189a, 189b and 189c contact respective pin rollers 182a, 182b and 182c that are in respective cavities 190a, 190b and 190c. The biasing members can be made from any type of material that provides a biasing force such as, but not limited to, compression springs, wire form springs, rubber elements, and the like.

The shape of the respective cavities 190a, 190b and 190c and contact of the respective plungers 189a, 189b and 189c on the respective pin rollers 182a, 182b and 182c only allow the OWC 150 to rotate in one direction in relation to post 120 of the first sheave portion 108. In particular, a biasing force from the biasing members 188a, 188b and 188c force the associated pin rollers 182a, 182b and 182c along associated ramped surfaces 197a, 197b and 197c in the respective cavities 190a, 190b and 190c such that a portion of the pin rollers 182a, 182b and 182c engage a shaft, such as post 120, received in passage 151 of the OWC 150 to prevent the OWC 150 from rotating in respect to the post 120 in a first direction. However, the pin rollers 182a, 182b and 182c are received within the respective cavity 190a, 190b and 190c to allow the OWC 150 to rotate in relation to the post 120 in a second direction.

Adjustment of force on the pin rollers 182a, 182b and 182c is accomplished by adjusting the respective set screws 186a, 186b and 186c in this embodiment. In operation, the pin rollers 182a, 182b and 182c are set to lock the OWC 150 to rotate with the post 120 of the first sheave portion 108 in a first direction and allow the OWC 150 to move independent (overrunning mode) of the rotation of the post 120 in the other direction as described above. A further illustration of the OWC is provided in the cross-sectional side perspective view of FIG. 3F. In another embodiment, pin rollers are set at the manufacture and set screws are not used. An example of a pre-set embodiment is illustrated in FIG. 9B below. OWC 150 is one example of an OWC that can be used. Any type of OWC or roller OWC known in the art that allows relative rotation in a first direction and disallows relative rotation in a second direction can be used.

Figure 4A:
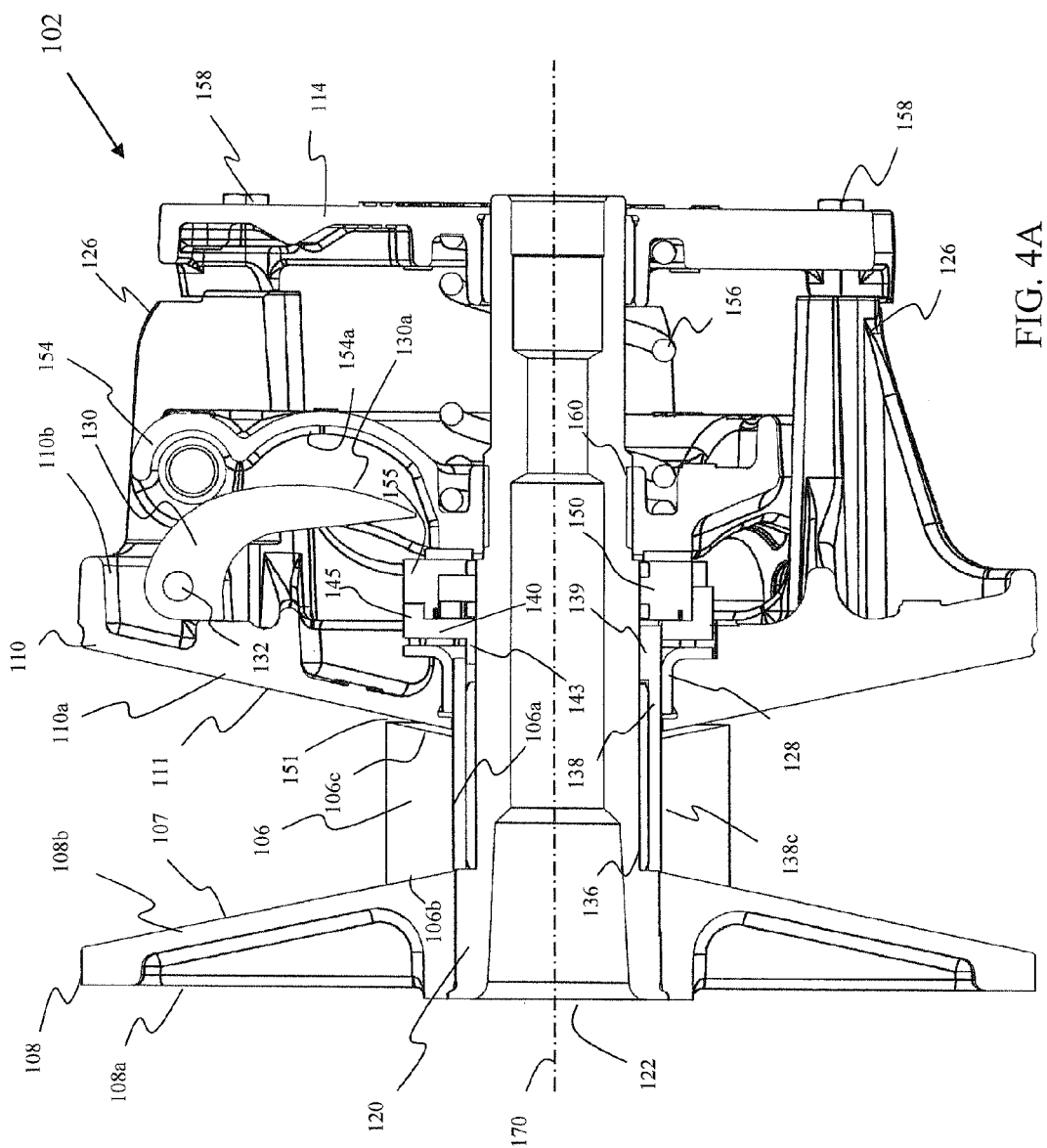
FIG. 4A is a side cross-sectional view of a primary clutch with a drive belt in an idle position of one embodiment of the present invention.
Figure 4B:
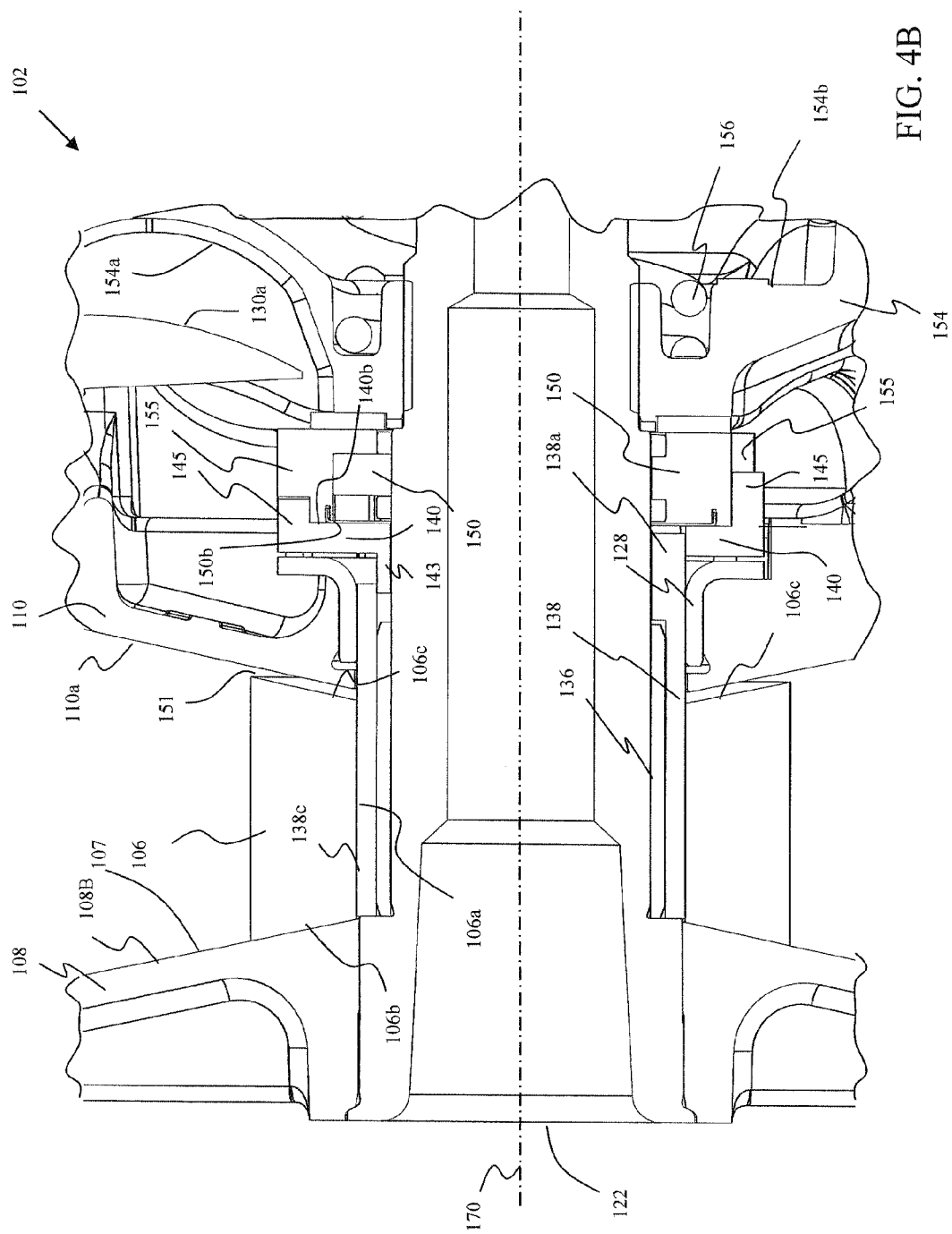
FIG. 4B is a close up side cross-sectional view of a portion of the primary clutch of FIG. 4A.

Further illustrations describing the operation of the primary clutch 102 are provided in FIGS. 4A through 6B. FIGS. 4A and 4B illustrate cross-sectional views of the primary clutch 102 and drive belt 106. FIG. 4B is a close up view of relevant portions of the primary clutch 102 and drive belt 106. In particular, FIGS. 4A and 4B illustrate the primary clutch 102 during an idle operation mode. During idle situations, only the inner face 106a of the drive belt engages the engaging surface 138c of the sleeve coupler 138. The second conical-faced surface 111 of the second sheave portion 110 is spaced a distance away from the first conical-faced surface 107 of the first sheave portion 108 so there is a gap 151 between a second side face 106c of the drive belt 106 and the second conical-faced surface 111 of the second sheave portion 110. A gap may also be (or may be in place of gap 151) between the first side face 106b of the drive belt 106 and the first conical-faced surface 107 (not shown). The gap 151 between the first conical-faced surface 107 of the first sheave portion 108 and the second conical-face surface 111 of the second sheave portion 110 is maintained by biasing member 156 during the idle operational mode. During an idle operation mode, friction between the inner face 106a of the drive belt 106 and the engaging surface 138c of the sleeve coupler 138 prevents sleeve coupler 138 and bearing 136 from turning while post 120 rotates with the rest of the primary clutch 102 that is engaged to receive the rotational output of the engine. Hence, in the idle operational mode, the engine is disconnected from the drive train because the drive belt is coupled only to the sleeve coupler 138, the ramp coupler 140 and the OWC 150 which is overrunning and therefore provides no moving force to the secondary clutch 104. Further in the idle operation mode, the second side 140b of the ramp coupler 140 abuts the first side 150a of the OWC 150. This is illustrated in FIG. 4B. Hence, in the idle operation mode, the at least one ramp 145 extending from the second side 140b of the ramp coupler 140 and the at least one ramp (generally designated as 155) on the OWC 150 are not engaged to ramp up the ramp coupler 140 from the OWC 150 since the OWC 150 is overrunning about surface portion 120a of the post 120. Further, flats 145e on the at least one ramp 145 of the ramp coupler are coupling flats 155e on the at least one ramp 155 of the OWC during idle mode operation. Also in idle mode operation, the engaging surface 130a of the flyweight 130 is in a neutral position that is away from the first side 154a of the spider 154.

Figure 5A:
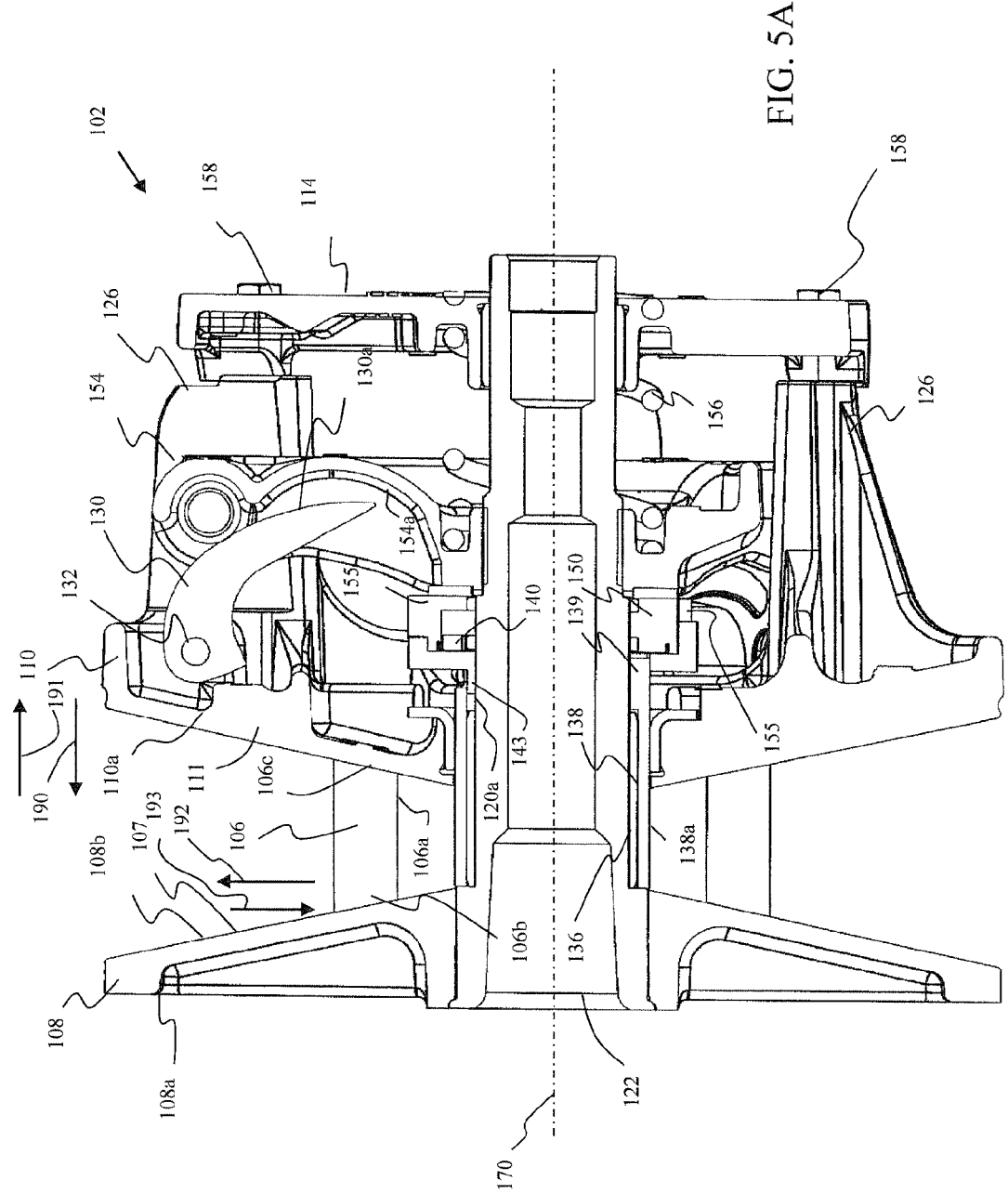
FIG. 5A is a side cross-sectional view of a primary clutch with a drive belt in an activated position of one embodiment of the present invention.
Figure 5B:
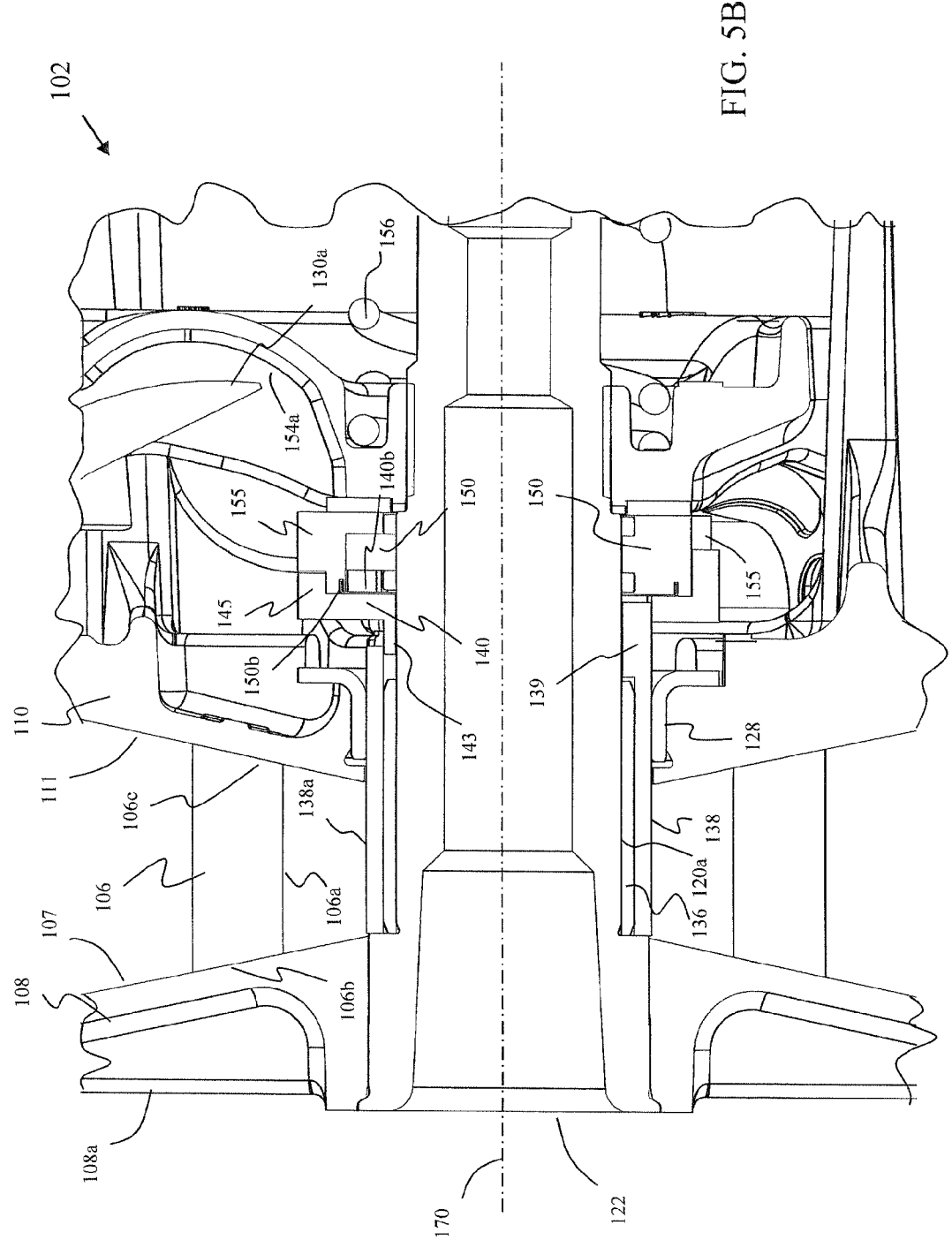
FIG. 5B is a close up side cross-sectional view of a portion of the primary clutch of FIG. 5A.

Cross-sectional views of the primary clutch 102 in an activation operational mode are illustrated in FIGS. 5A and 5B. FIG. 5B is a close up view of relevant portions of primary clutch 102. As FIGS. 5A and 5B illustrate, during activation operational mode, the flyweights 130 are pivoted towards the first surface 154a of the spider 154 due to the centrifugal forces caused by the rotation of the primary clutch 102. As a result of the pivoting of the flyweights, a push force is generated by the engaging surface 130a of the flyweights 130 on the engaging pin/roller subassemblies 157 of the spider 154. This push force counters the biasing force of the biasing member 156 on the spider 154 thereby moving the second sheave portion 110 closer to the first sheave portion 108 of the primary clutch 102. The faster the rotation of the primary clutch 102, the stronger the centrifugal force (and hence the push force) and the closer the second sheave portion 110 is moved towards the first sheave portion 108. As FIGS. 5A and 5B illustrate, as the second sheave portion 110 moves towards the first sheave portion 108 the first conical-faced surface 107 of the first sheave portion 108 and the second conical-faced surface 111 of the second sheave portion 110 engage respective side faces 106b and 106c of the drive belt. As the second sheave portion 110 moves closer yet to the first sheave portion 108 (indicated by arrow 190 in FIG. 5A), the drive belt 106 is forced farther away from the rotational axis 170 (as indicated by arrow 192 of FIG. 5A). The primary clutch 102 is designed to only allow the second sheave portion 110 to move a select distance towards the first sheave portion 108 so the drive belt 106 remains contained between the first and second conical-faced surfaces 107 and 111.

When the rotational speed of the primary clutch slows, the centrifugal force on the flyweights 130 is reduced and the biasing force causes the second sheave portion 110 to move away from the first sheave portion 108 (as indicated by arrow 191 of FIG. 5A). As a result the drive belt 106 moves closer towards the rotational axis 170 (as indicated by arrow 193 of FIG. 5A). The continuously changing distance between the drive belt 106 and the rotational axis 170 provides continuously changing transmission ratios. In addition to changing the transmission ratios with the spacing of the first and second conical-faced surfaces 107 and 111, the friction between the engaged side faces 106b and 106c of the drive belt 106 with the respective conical-faced surfaces 107 and 111 cause the drive belt 106 to move with the rotation of the primary clutch 102. The drive belt 106 in turn provides rotation to the secondary clutch 104 to power the drive train in the non-engine braking operational mode.

FIGS. 6A and 6B illustrate a cross-sectional side view of the primary clutch 102 in an engine braking operational mode. FIG. 6B is a close up view of relevant portions of the primary clutch 102. In an engine braking situation without an engine braking system (EBS), the primary clutch 102 will not be rotationally connected to the secondary clutch 104 that is coupled to a drive train of the vehicle. An example situation where this can occur is when the operator of the vehicle lets off on the gas while the vehicle is traveling down a steep incline. In a typical CVT system the drive belt, in this situation, will be essentially disconnected (in an idle configuration as discussed above) from the primary drive because slip will occur when the conical faced surfaces 107 and 111 no longer engage the sides 106b and 106c of the belt 106 and the inner surface 106a of the belt 106 moves away from the post 120 to allow free rotational movement of the post 120 and engine during idle. Hence, in a typical CVT system without EBS, the vehicle must rely on other braking means during this situation. Other braking means, however, may not be adequate in all situations.

As FIGS. 6A and 6B illustrate, in the engine braking operational mode, the flyweights 130 are not subject to significant centrifugal forces that cause the engaging surface 130a of the flyweight 130 to pivot towards the first side 154a of the spider 154. This is because the rotation speed of the primary clutch 102 is relatively low (and hence so is the rotational output of the engine as the result of letting up on the throttle) in an engine braking situation. Therefore, the flyweights 130 cannot be used to force the second sheave portion 110 towards the first sheave portion 108 in this situation. In the engine braking situation, the secondary clutch 104 is pushing the belt 106 to a maximum radius on the secondary clutch 104 and thus to a minimum radius on the primary clutch 102. Hence, the drive belt 106 that is rotationally coupled to the secondary clutch 104 will move the sleeve coupler 138 (which the inner face 106a of the belt drive is engaged with) faster than the post 120 of the first sheave portion 108. Therefore, the sleeve coupler 138 will rotate in relation to the post 120 of the first sheave portion 108 to try and overrun the post 120.

Since, the sleeve coupler dogs 139 are engaged with the ramp coupler dogs 143 of the ramp coupler 140, the ramp coupler 140 also rotates in relation to post 120. This rotation of the ramp coupler 140 causes the at least one coupler ramp 145 to slideably engage the at least one ramp 155 of the OWC 150. The OWC 150 is designed to remain synchronous with the belt and the ramp coupler while allowing the post to rotate (engine idling) but lock up with the post 120 in the other direction of rotation while engine braking where the at least one coupler ramp 145 of the ramp coupler 140 will rotate in relation to the at least one clutch ramp 155 of the OWC 150. The rotation of the at least one ramp 145 in relation to the at least one ramp 155 causes second side 140b of the ramp coupler 140 to axially move away from the first side 150a of the OWC 150 to form a gap 195. Since the second side 150b of the OWC 150 is positioned against the thrust washer 152 and the thrust washer 152 abuts surface 154c of the non-axially moving spider 154, the ramp coupler 140 is forced to move axially towards the second sheave portion 110. In particular, the first side 140a of the ramp coupler 140 pushes on bushing 128 (which is a flanged plain bearing in this embodiment) countering the biasing force of the biasing member 156 to move the second sheave portion 110 towards the first sheave portion 108 a select distance. Free play in the rotational coupling between the sleeve coupler dogs 139 of the sleeve coupler 138 and the ramp coupler dogs 143 of the ramp coupler 140 allows movement of the ramp coupler 140 axially towards the second sheave portion 110. The movement of the second sheave portion 110 towards the first sheave portion 108 causes the drive belt 106 to be frictionally engaged on three sides. That is, the inner face 106a of the drive belt 106 is engaged with the engaging surface 138c of the sleeve coupler 138, the first side face 106b of the drive belt 106 is engaged with the first conical-faced surface 107 of the first sheave portion 108 and the second side face 106c of the drive belt 106 is engaged with the second conical-faced surface 111 of the second sheave portion 110. This action reconnects the engine to the drive train via the drive belt 106 and the primary and secondary clutches 102 and 104 to allow for engine braking. The engagement of each of the three of the drive belt face surfaces 106a, 106b and 106c are needed to create enough friction to overcome the rotation forces provided by the drive train in applications were the vehicle is relatively heavy.

The engagement of the drive belt 106 as described above in the engine braking operation mode will continue as long as the secondary clutch 104 is providing a force on the drive belt 106 as the result of the drive train trying to move the secondary clutch 104 faster than the primary clutch 102. When the force provided by the secondary clutch 104 subsides, rotation of the post 120 of the first sheave portion 108 of the primary clutch 102 will be faster than the rotation of the secondary clutch 104. Hence, rotation of the sleeve coupler 138 and the ramp coupler 140 will be slower than the rotation of the OWC 150. As a result, the at least one coupler ramp 145 of the ramp coupler 140 will rotate in relation to the at least one ramp 155 of the OWC 150 in the opposite direction as described above. This rotation causes the second side 140b the ramp coupler 140 to be positioned once again proximate the first side 150a to the OWC 150 where the flat 145e of the at least one coupler ramp 145 of the ramp coupler 140 couples the flat 155e of the at least one ramp 155 of the OWC 150 thereby removing the force on the second sheave portion 110 by the ramp coupler 140. Moreover, the biasing force provided by biasing member 156 further provides the biasing force to push the second side 140*b* the ramp coupler 140 to be against the first side 150*a* of the OWC 150 when returning to the idle operational mode.

Figure 7A:
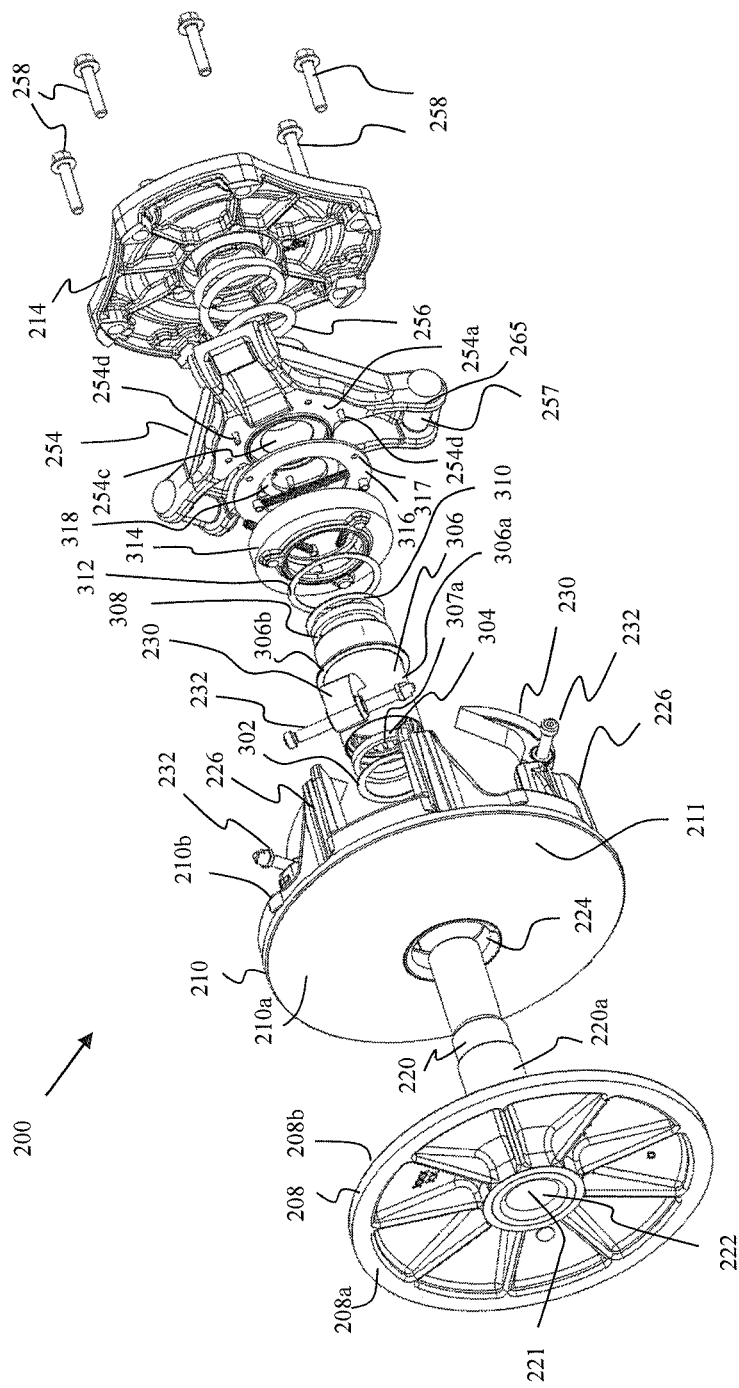
FIG. 7A is an unassembled front-side perspective view of another embodiment of a primary clutch of the present invention.
Figure 7B:
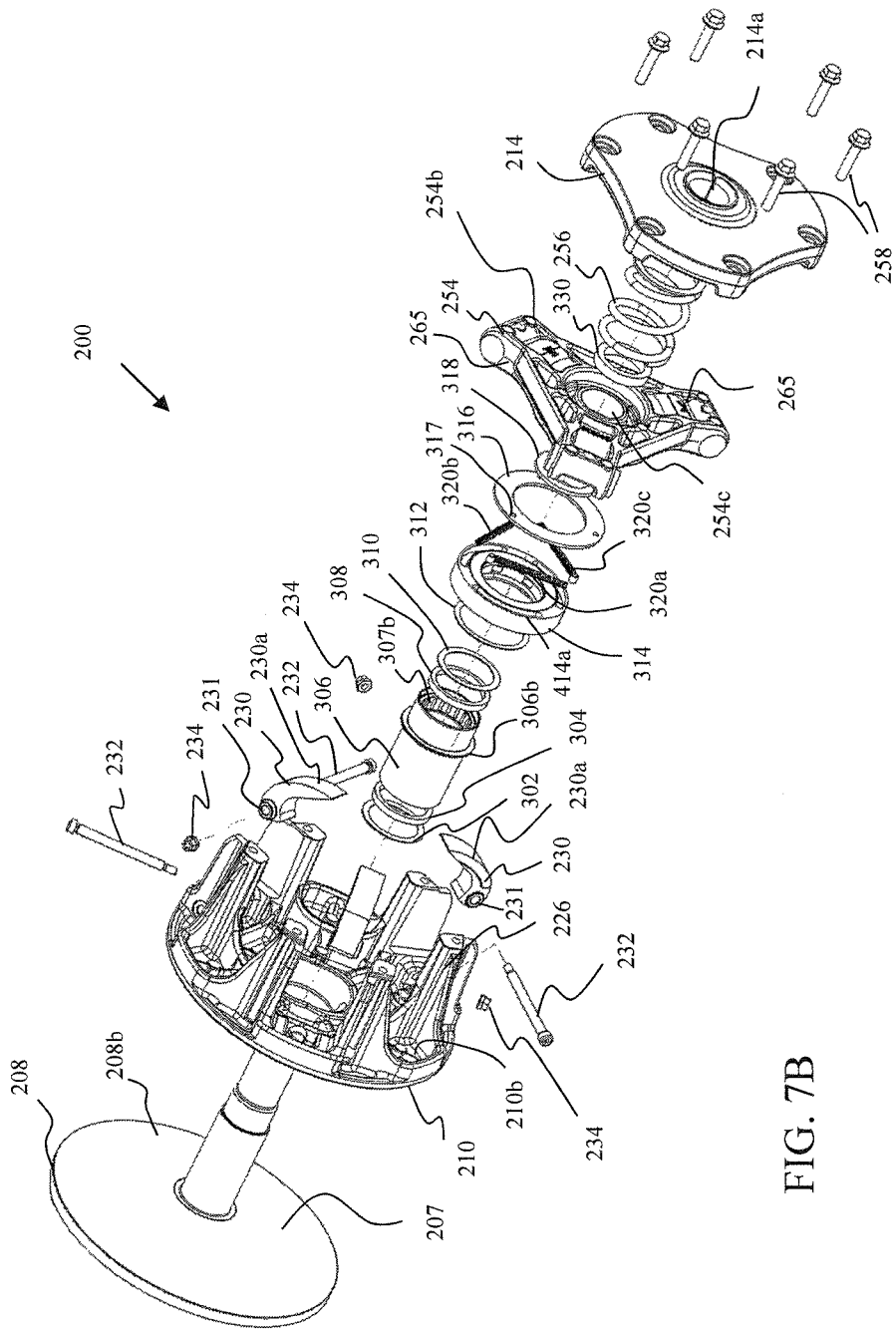
FIG. 7B is an unassembled rear-side perspective view of the primary clutch of FIG. 7A.

Another embodiment of a primary clutch 200 is illustrated in FIGS. 7A and 7B. In particular, FIG. 7A illustrates a first unassembled front-side perspective view of the primary clutch 200 and FIG. 7B illustrates a second unassembled rear-side view of the primary clutch 200. As FIGS. 7A and 7B illustrate, the primary clutch 200 includes a first sheave portion 208 and a second sheave portion 210. The first sheave portion 208 includes a first side 208*a* and second side 208*b*. The first side 208*a* of the first sheave portion 208 includes a central opening 222. The second side 208*b* of the first sheave portion 208 includes a first conical-faced surface 207 designed to engage a first side face 106*b* of a drive belt 106. The first sheave portion 208 further includes a post 220 that centrally extends from the first conical-faced surface 207. The post 220 includes a bore 221 centered about a rotational axis 270 of the primary clutch 200 as illustrated at least in FIG. 10A. The bore 221 is further aligned with the central opening 222. Bore 221 is designed to receive a rotational output from an engine (not shown). For example, in one embodiment, bore 221 is designed to engage a crankshaft (not shown) of an engine that is passed through the central opening 222. In other embodiments, other mechanisms provide the rotational output of the engine to the primary clutch 200. The first sheave portion 208 and the post 220 rotate in response to the rotational output of the engine.

Figure 10A:
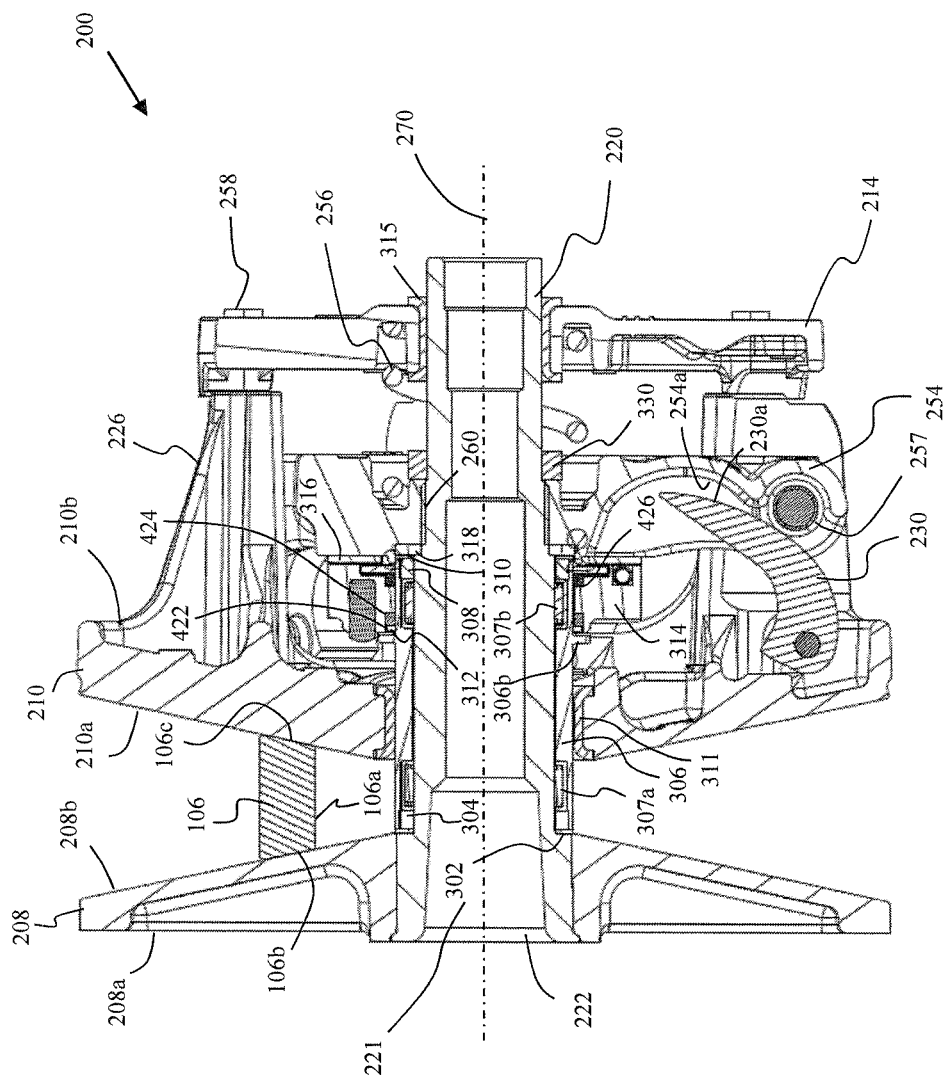
FIG. 10A is an assembled cross-sectional side view of the primary clutch of FIG. 7A in an activated position.
Figure 10B:
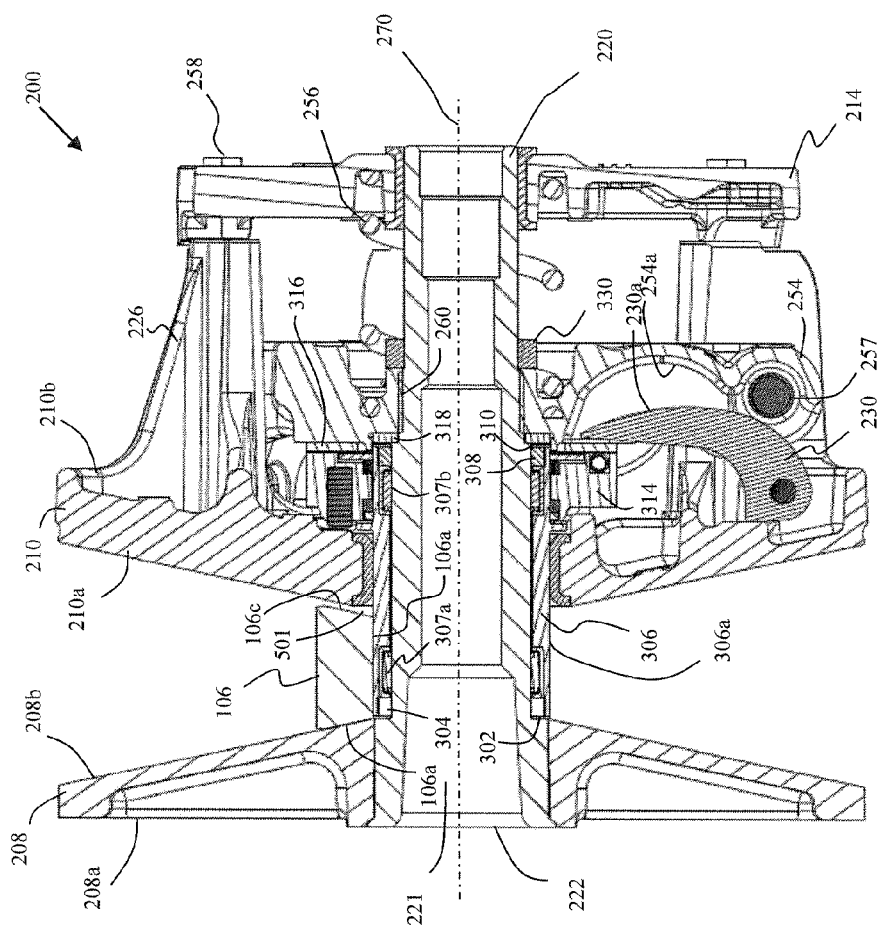
FIG. 10B is an assembled cross-sectional side view of the primary clutch of FIG. 7A in an idle position.
Figure 10C:
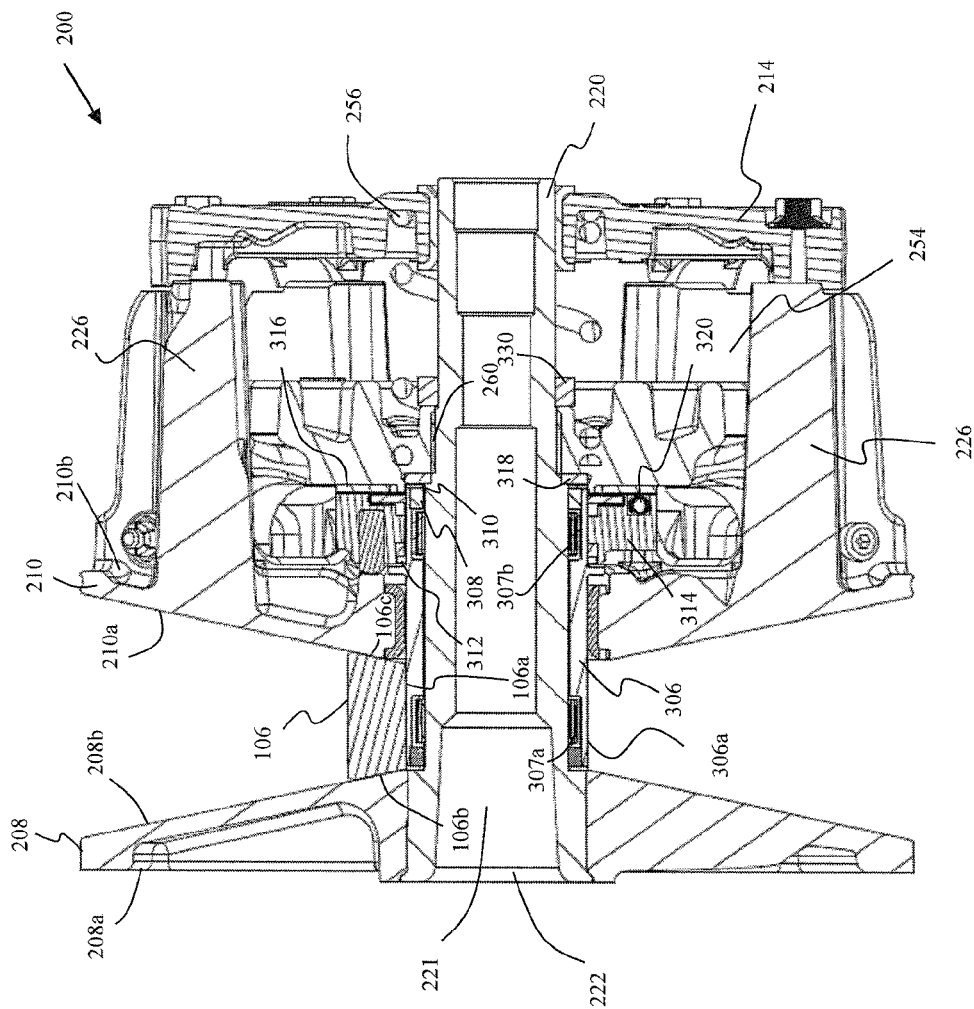
FIG. 10C is an assembled cross-sectional side view of the primary clutch of FIG. 7A in an engine braking position.

The second sheave portion 210 of the primary clutch 200 includes a first side 210*a* and a second side 210*b* as illustrated in FIGS. 7A and 7B. The first side 210*a* of the second sheave portion 210 includes a second conical-faced surface 211. The second conical-faced surface 211 is designed to engage a second side face 106*c* of a drive belt 106. The second sheave portion 210 further includes a central sheave passage 224. A sleeve coupler 306 is received around a first portion 220*a* of the post 220 of the first sheave portion 208. In this embodiment, the sleeve coupler 306 includes a first internal set of needle bearings 307*a* and a second set of needle bearings 307*b* that engage a surface of the first portion 220*a* of the post 220. An illustration of the sleeve coupler 306 received on the first portion 220*a* of the post 220 is illustrated in FIGS. 10A through 10C. Sleeve coupler 306 included a flange 306*b* that protrudes from an outer surface 306*a* of the sleeve coupler 306. A first thrust washer 302 and a first seal 304 are position between an end of the sleeve coupler 306 and the second side 208*b* of the first sheave 208 as illustrated in FIG. 10A through 10C. As further illustrated in FIGS. 10A through 10C, a bushing 311 in the central opening 224 of the second sheave portion 210 contacts a portion of the outer surface 306*a* of the sleeve coupler 306. Moreover, an edge of the bushing 311 abuts one side of the flange 306*b* of the sleeve coupler 306.

Figure 8:
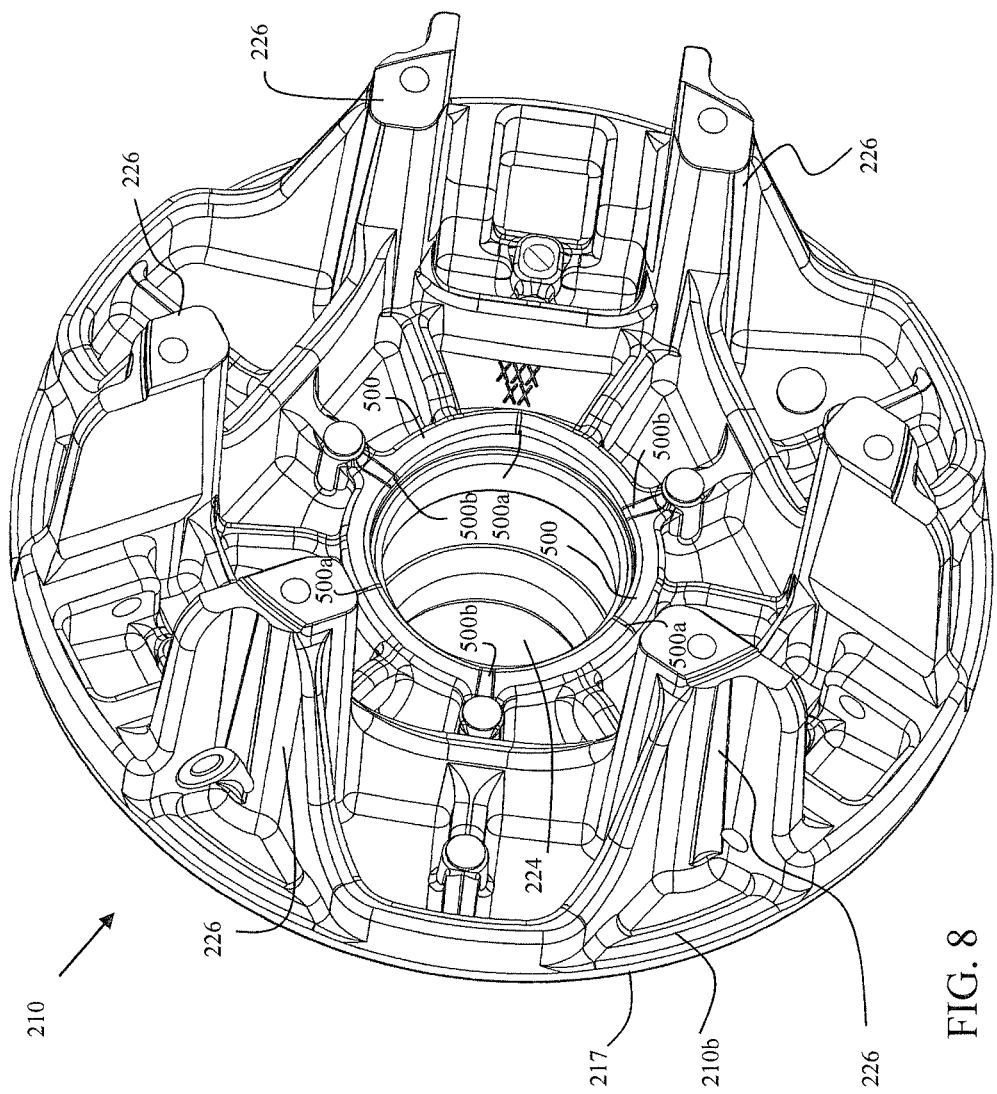
FIG. 8 is a rear perspective view of a second sheave portion of one embodiment of the present invention.

The second sheave portion 210 further has a plurality of arm extending portions 226 (bosses) that extend out generally perpendicular proximate an outer perimeter 217 of the second side 210*b* of the second sheave portion 210. This is illustrated in the rear perspective view of the second sheave portion 210 of FIG. 8. Further illustrated in FIG. 8, is a braking ramp rim 500 that extends around an opening to the central passage 224 of the second sheave portion 210. The braking ramp rim 500 has a height from the second side 210*b* of the second sheave portion 210 that varies. In particular, in this embodiment, the braking ramp rim 500 varies from three low height positions 500*b* to three high height positions 500*a*. In one embodiment, the different between a low height position 500*b* and a high height position 500*a* is in a range of 0.020 of an inch to 0.500 of an inch. However, the difference can be more or less depending on the application (i.e. the size of the vehicle, the brake torque needed, etc). Torque buttons 412*a*, 412*b* and 412*c* (moving members) in a one way clutch 314 described below engage the braking ramp rim 500 to selectively move the second sheave portion 210 towards the first sheave portion 208 during an engaging braking situation in this embodiment as described below.

Figure 9D:
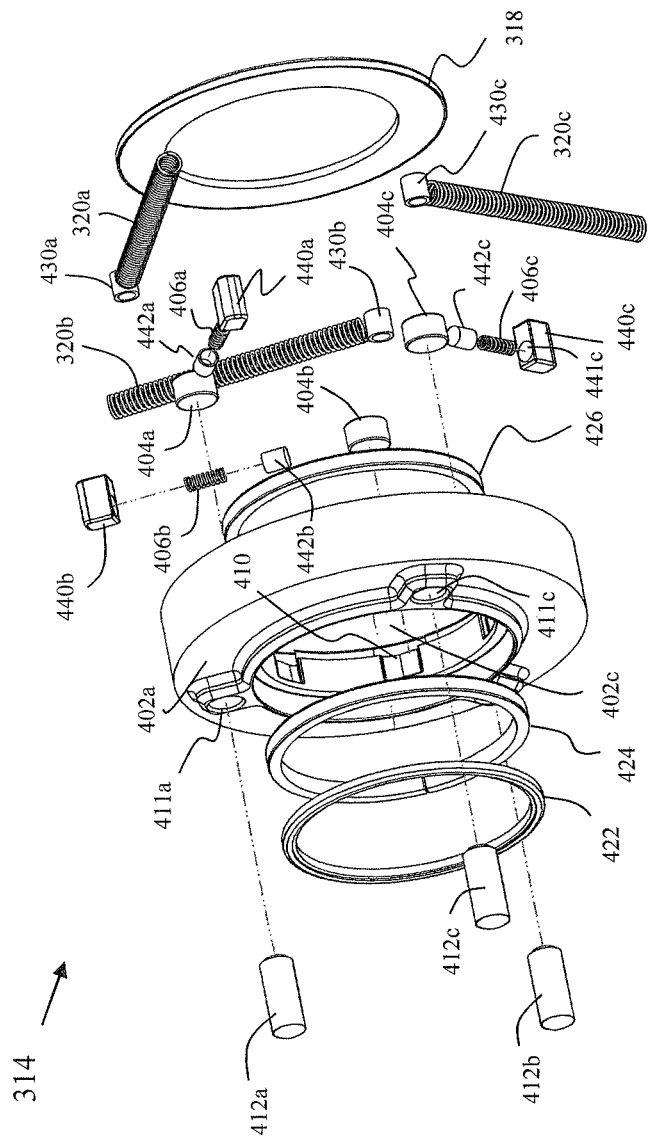
FIG. 9D is an unassembled front-side view of the OWC of FIG. 9A.

An example embodiment of a one way clutch (OWC) 314 is illustrated in FIGS. 9A through 9F. The OWC 314 includes a housing 402 with a first side 402*a*, a second side 402*b* and a central passage 402*c*. Similar to the embodiment described above, the housing 402 includes internal cavities 408*a*, 408*b* and 408*c* as illustrated in FIG. 9B. Pin rollers 404*a*, 404*b* and 404*c* are received in the respective internal cavities 408*a*, 408*b* and 408*c*. Pin roller biasing members 406*a*, 406*b* and 406*c* are also received in the internal cavities 408*a*, 408*b* and 408*c*. The biasing members 406*a*, 406*b* and 406*c* exert a biasing force on the respective pin rollers 404*a*, 404*b* and 404*c* towards one end of the respective cavities 408*a*, 408*b* and 408*c*. Each of the cavities 408*a*, 408*b* and 408*c* has an opening into the central passage 402*c* of the housing 402. The central passage 402*c* is received around the outer surface 306*a* of the sleeve coupler 306 as illustrated in FIGS. 10A through 10C. The shape of the internal cavities 408*a*, 408*b* and 408*c* and the biasing members 406*a*, 406*b* and 406*c* allow the OWC 314 to rotate independent of the rotation of the sleeve coupler 306 in one direction and lockup the OWC 314 with the sleeve coupler 306 in the other direction (i.e. where the respective pin rollers 404*a*, 404*b* and 404*c* engage the outer surface 306*a* of the sleeve coupler 306).

Figure 9E:
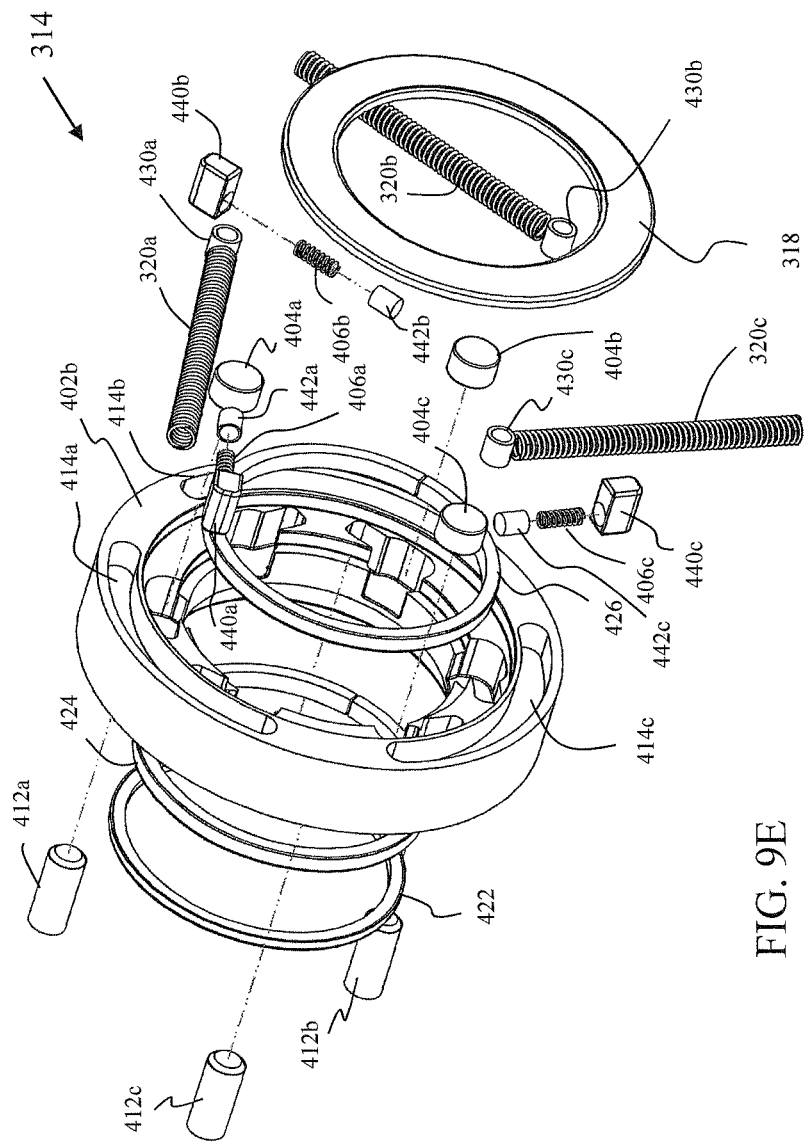
FIG. 9E is an unassembled back-side view of the OWC of FIG. 9A.

Referring back to FIG. 9B, the cross section view illustrates additional cavities 410 formed in the housing 402 of the OWC 314 in this embodiment. The additional cavities 410 are used to change the direction of the OWC 314. Hence, if a OWC 314 is needed that locks in an opposite direction, the pin rollers 404*a*, 404*b* and 404*c* and the pin roller biasing members 406*a*, 406*b* and 406*c* are repositioned in respective cavities 410. In one embodiment, each pin roller biasing member 406*a*, 406*b* and 406*c* includes a spring block retainer 440*a*, 440*b* and 440*c* and a plunger 442*a*, 442*b*, 442*c* as seen in FIGS. 9D and 9E. The spring block retainers 440*a*, 440*b* and 440*c* are designed to receive a first end of respective biasing members 406*a*, 406*b* and 406*c* (which are springs in this embodiment). The plungers 442*a*, 442*b* and 442*c* are designed to receive a second end of the respective biasing members 406*a*, 406*b* and 406*c*. The spring block retainers 440*a*, 440*b* and 440*c* help retain the first end of the biasing members 406*a*, 406*b* and 406*c* within the respective cavities 408*a*, 408*b* and 408*c*. The plungers 442*a*, 442*b* and 442*c* on the second end of the biasing members 406*a*, 406*b* and 406*c* engage the respective pin rollers 404*a*, 404*b* and 404*c*.

The first side 402*a* of the housing 402 of the OWC 314 in this embodiment includes bores 411*a*, 411*b* and 411*c*. The bores 411*a*, 411*b* and 411*c* are illustrated in FIGS. 9B and 9D. Torque buttons 412*a*, 412*b* and 412*c* are received in the respective bores 411*a*, 411*b* and 411*c*. The torque buttons 412*a*, 412*b* and 412*c* each have an end that extends out beyond the first side 402*a* of the housing 402 of the OWC 314 as illustrated in FIG. 9C. The end of the torque buttons 412*a*, 412*b* and 412*c* are aligned with the braking ramp rim 500 of the second sheave portion 210. When the OWC 314 is rotating independent of the sleeve coupler 306, torque buttons 412*a*, 412*b* and 412*c* are positioned proximate the low height positions 500*b* of the braking ramp rim 500. When the OWC 314 locks onto the sleeve coupler 306, the rotation of the OWC 314 and the sleeve coupler 306, causes the torque buttons 412*a*, 412*b* and 412*c* to rotate from the low height positions 500*b* towards the high height positions 500*a* along the ramp profile of the braking ramp rim 500. This action forces the second sheave 210 toward the first sheave 208 in an engine braking situation as further discussed below. Referring to FIG. 9D, a seal 422 and a bearing 424 are positioned proximate the first side 402a and central passage 402c of the housing 402 of the OWC 314. Although in this embodiment the torque buttons 412a, 412b and 412c are coupled to the OWC 314 and the braking ramp rim 500 is on the second sheave portion 210, an opposite arrangement could be used having the same desired effect. Moreover, any engine braking assembly that effectively moves the second sheave portion 210 towards the first sheave portion 208 as the result of the sleeve coupler 306 attempting to overrun the post 220 is contemplated. Further, although the OWC 314 is described as roller pin OWC, any type of OWC can be used such as, but not limited to, roller clutches, sprag clutches, etc.

Figure 9F:
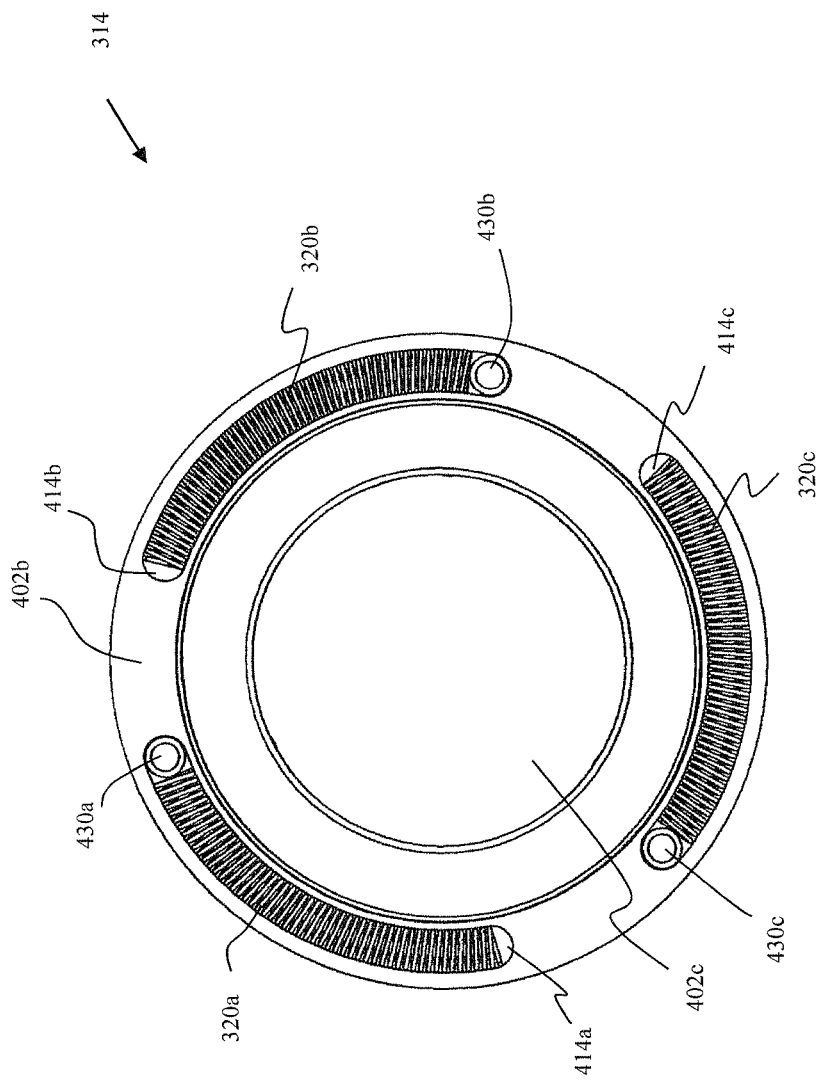
FIG. 9F is a rear view of the OWC of FIG. 9A.

The second side 402b of the housing 402 of the OWC 314 includes three slots 414a, 414b and 414c. Three return biasing members 320a, 320b, 320c are received in the respective three slots 414a, 414b and 414c as illustrated in FIG. 9F. One end of each return biasing members 320a, 320b, 320c is coupled to a respective biasing pin connector 430a, 430b and 430c. Spider pins 254a and 254b (and a third pin not shown in FIG. 7A) on spider 254 passing though apertures 317 in thrust washer 316 (shown in FIG. 7A) are designed to be received in respective connectors 430a, 430b and 430c of the return biasing members 320a, 320b and 320c. This arrangement of the return biasing members 320a, 320b, and 320c allows the OWC 314 to return to a non-torque position (i.e. the torque buttons being position proximate the low height position 500b of the braking ramp rim 500) after an engine braking situation has passed. Further illustrated in FIG. 10A is bearing 426 positioned proximate the second side 402b of the housing 402 of the OWC 314 and seal 318 that is positioned about the second side 402b of the housing 402 of the OWC.

Referring back to FIGS. 7A and 7B, the primary clutch 200 includes a cover 214 with a central opening 214a. The central cover opening 214a receives an end of the post 220 of the first sheave portion 208. The cover 214 has a plurality of apertures that align with threaded bores (not shown) in the arm extending portions 226 (bosses) of the second sheave portion 210. Fasteners 258, such as bolts, are passed through the plurality of the apertures in the cover 214 and are threadably engaged with the threaded bores in the arm extending portions 226 of the second sheave portion 210. The primary clutch 200 also includes the spider 254. The spider 254 includes a first side 254a, a second side 254b and a central spider passage 254c. The central spider passage 254c is received around and coupled to a portion of the post 220 of the first sheave portion 208. In particular, the spider 254 is solidly coupled about connection 260 as illustrated in FIG. 10A. In one embodiment, the connection 260 is mated threads. This connection 260 keeps the spider 254 static in relation to the post 220 thereby preventing the spider 254 from moving axially along the axis of rotation 270. The spider 254 is positioned between the cover 214 and the second sheave portion 210 as illustrated. The spider 254 further includes radially extending arms 265. Each radially extending arm 265 holds an engaging pin/roller subassembly 257. A washer 318 is positioned between an end of the sleeve coupler 306 and the first side 254a of the spider 254. A biasing member 256 is positioned between the second side 254b of the spider 254 and the cover 214. The biasing member 256, which in this embodiment is a spring, provides a biasing force separating the spider 254 from the cover 214. Moreover, since the second sheave portion 210 is coupled to the cover 214 via fasteners 258, the biasing force of the biasing member 256 forces the second sheave portion 210 away from the first sheave portion 208 and towards the spider 254.

A plurality of flyweight members 230 are rotationally coupled the second side 210b of the second sheave portion 210. In particular, in this embodiment each flywheel 230 has a flyweight passage 231 that is rotationally mounted on a pivot rod 232. Each pivot rod 232 is coupled to the second sheave portion 210 via connector 234. The plurality of the flyweights 230 are designed to pivot on the pivot rod 232 such that an engaging surface 230a of the flyweights 230 moves towards the first side 254a of the spider 254 in response to select angular rotational speeds of the second sheave portion 210. In particular, a centrifugal force created by the rotation of the second sheave portion 210 causes the flyweights 230 to pivot about pivot rods 232 causing the engaging surfaces 230a of the flyweights 230 to push on the engaging pin/roller subassemblies 257 of spider 254. The faster the rotation of the second sheave portion 210, the more push force the flyweights 230 exert on the spider 254. This push force counters the biasing force created by biasing member 256 thereby moving the second sheave portion 210 closer to the first sheave portion 208 and away from the spider 254. During acceleration of the rotation of the CVT 100, the movement of second sheave portion 210 toward the first sheave portion 208 causes the drive belt 106 to move farther away from the rotation axis 270 of the primary clutch 200 thereby changing into higher gearing of the CVT 100. During de-acceleration of the rotation of the CVT 100 (where the biasing force becomes greater than the push force), the movement of second sheave portion 210 away from the first sheave portion 208 causes the drive belt 106 to move closer to the rotation axis 270 of the primary clutch 200 thereby changing into lower gearing of the CVT 100. This is further discussed below. Although, a sheave moving member based on the rotational speed of the sheave implementing flyweights is described above, other types of the sheave moving members know in the art are contemplated and the present invention is not limited to flyweight systems.

Referring to FIG. 10A a cross-sectional view of the primary clutch 200 in an activation operational mode is illustrated. As FIG. 10 illustrates, during an activation operational mode, the flyweights 230 are pivoted towards the first surface 254a of the spider 254 due to the centrifugal forces caused by the rotation of the primary clutch 200. As a result of the pivoting of the flyweights, a push force is generated by the engaging surface 230a of the flyweights 230 on the engaging pin/roller subassemblies 257 of the spider 254. This push force counters the biasing force of the biasing member 256 on the spider 254 thereby moving the second sheave portion 210 closer to the first sheave portion 208 of the primary clutch 200. The faster the rotation of the primary clutch 200, the stronger the centrifugal force (and hence the push force) and the closer the second sheave portion 210 is moved towards the first sheave portion 208. As the second sheave portion 210 moves towards the first sheave portion 208 the first conical-faced surface 207 of the first sheave portion 208 and the second conical-faced surface 211 of the second sheave portion 210 engage respective side faces 106b and 106c of the drive belt 106. As the second sheave portion 210 moves closer to the first sheave portion 208, the drive belt 106 is forced farther away from the rotational axis 270. As with the embodiment discussed above, the primary clutch 200 is designed to only allow the second sheave portion 210 to move a select distance towards the first sheave portion 208 so the drive belt 106 remains contained between the first and second conical-faced surfaces 207 and 211.

In FIG. 10B, the primary clutch 200 is illustrated during an idle operation mode. During idle situations, only the inner face 106a of the drive belt engages the surface 306a of the sleeve coupler 306. The second conical-faced surface 211 of the second sheave portion 210 is spaced a distance away from the first conical-faced surface 207 of the first sheave portion 208 so there is a gap 501 between a second side face 106c of the drive belt 106 and the second conical-faced surface 211 of the second sheave portion 210. A gap may also be (or may be in place of gap 501) between the first side face 106b of the drive belt 106 and the first conical-faced surface 207 (not shown). The gap 501 between the first conical-faced surface 207 of the first sheave portion 208 and the second conical-face surface 211 of the second sheave portion 210 is maintained by biasing member 256 during the idle operational mode. During an idle operation mode, friction between the inner face 106a of the drive belt 106 and the outer surface 306a of the sleeve coupler 306 prevents sleeve coupler 306 from turning while post 220 rotates with the rest of the primary clutch 200 that is engaged to receive the rotational output of the engine. Hence, in the idle operational mode, the engine is disconnected from the drive train because the drive belt 106 is coupled only to the sleeve coupler 306 and the OWC 314 (which is overrunning) provides no moving force to the secondary clutch 104. Further in the idle operation mode, the torque buttons 412a, 412b and 412c of the OWC 314 are in a non-torque position (i.e. the torque buttons being position proximate the low height position 500b of the braking ramp rim 500 of the second sheave portion 210.

FIG. 10C illustrates the primary clutch 200 in the engine braking operational mode. In the engine braking operational mode the flyweights 230 are not subject to significant centrifugal forces that cause the engaging surface 230a of the flyweight 230 to pivot towards the first side 254a of the spider 254. This is because the rotation speed of the primary clutch 200 is relatively low (and hence so is the rotational output of the engine as the result of letting up on the throttle) in an engine braking situation. Therefore, the flyweights 230 cannot be used to force the second sheave portion 210 towards the first sheave portion 208 in this situation. In the engine braking situation, the secondary clutch 104 is pushing the belt 106 to a maximum radius on the secondary clutch 104 and thus to a minimum radius on the primary clutch 200. Hence, the drive belt 106 that is rotationally coupled to the secondary clutch 104 will move the sleeve coupler 306 (which the inner face 106a of the belt drive is engaged with) faster than the post 220 of the first sheave portion 208. Therefore, the sleeve coupler 306 will rotate in relation to the post 220 of the first sheave portion 208 to try an overrun the post 220.

As stated above, the OWC 314 is designed to rotate independently of the sleeve coupler 306 while the sleeve coupler rotates in one direction in relation to the OWC 314 (engine idling) but lock up with the sleeve coupler 306 when the sleeve coupler 306 rotates in the other direction of rotation in relation to the OWC (engine braking). When the OWC 314 locks up on the sleeve coupler 306, the rotation of the OWC 314 and the sleeve coupler 306, causes the torque buttons 412a, 412b and 412c to rotate to engage the ramp rim 500 moving towards the high height positions 500a from the low positions 500b. This action forces the second sheave 210 toward the first sheave 208 thereby countering the bias force supplied by bias member 256. This action reconnects the engine to the drive train via the drive belt 106 and the first and second clutches 200 and 104 to allow for engine braking. The engagement of each of the three of the drive belt face surfaces 106a, 106b and 106c are needed to create enough friction to overcome the rotation forces provided by the drive train in applications were the vehicle is relatively heavy.

The engagement of the drive belt 106 as described above in the engine braking operation mode will continue as long as the secondary clutch 104 is providing a force on the drive belt 106 as the result of the drive train trying to move the second clutch 104 faster than the first clutch 200 (primary clutch). When the force provided by the secondary clutch 104 subsides, rotation of the post 220 of the first sheave portion 208 of the first clutch 200 will be faster than the rotation of the secondary clutch 104. The return biasing members 320a, 320b, and 320c allows the OWC 314 to return to a non-torque position (i.e. the torque buttons being position proximate the low height position 500b of the braking ramp rim 500) after an engine braking situation has passed.

Embodiments of the CTV 100 system can be used with any type of vehicle including, but not limited to, all-terrain vehicles (ATVs), utility vehicles, golf carts, cars, trucks, boats etc. Moreover, the drive belt 106 used with the CVT system may be made from any type of material that provides adequate rotational communication between the primary sheave 102, 200 and the secondary sheave 104 for a given application. Examples of drive belt materials include, but are not limited to, rubber, polyurethane, urethane, neoprene, fiber reinforced materials as well has as drive belts made from metals.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A primary clutch assembly comprising:
   a first sheave portion having a first conical-faced surface, the first conical-faced surface configured to engage a first side face of a drive belt, the first sheave portion further having a post centrally extending from the first conical-faced surface;
   a cylindrical sleeve coupler rotationally mounted on a portion of the post proximate the first conical-faced surface, the sleeve coupler having an engaging surface configured to engage an inner face of the drive belt;
   a second sheave portion having a central passage rotationally mounted on the sleeve coupler, the second sheave portion having a second conical-faced surface positioned to face the first conical-faced surface of the first sheave portion, the second conical-faced surface configured to engage a second side face of the drive belt; and
   an engine braking assembly operatively coupled to the second sheave portion and the sleeve coupler to axially move the second sheave portion toward the first sheave portion to engage the first conical-faced surface of the first sheave portion with the first side face of the drive belt and the second conical-faced surface of the second sheave portion with the second side face of the drive belt when the sleeve coupler attempts to overrun the post of the first sheave portion in a rotational direction provided by a rotational output of an engine operatively coupled to the primary clutch.

2. The primary clutch assembly of claim 1, wherein the engine braking assembly further comprises:
   a ramp coupler having a first end and a second end, the ramp coupler rotationally mounted on the post of the first sheave portion, the first end of the ramp coupler rotationally coupled to the sleeve coupler, the second end of the ramp coupler having at least one coupler ramp;

a one way clutch (OWC) rotationally mounted on the post of the first sheave portion, the OWC having at least one clutch ramp positioned to engage the at least one coupler ramp of the ramp coupler, wherein rotational movement of the ramp coupler in relation to the post rotates the at least one coupler ramp of the ramp coupler in relation to the at least one clutch ramp of the OWC thereby axially moving the second sheave portion in relation to the first sheave portion.

3. The primary clutch assembly of claim 1, wherein the at least one clutch ramp extends radially from a surface defining an outer perimeter of the OWC.

4. The primary clutch assembly of claim 2, further comprising:
the first end of the ramp coupler having a plurality of ramp coupler dogs; and
the sleeve coupler having a plurality of sleeve coupler dogs configured to be mated with the ramp coupler dogs of the ramp coupler to provide the rotational coupling between the ramp coupler and the sleeve coupler.

5. The primary clutch assembly of claim 2, wherein the OWC is further generally ring shaped having first side, a second side, a central passage and a plurality of cavities, each cavity having a pin roller opening to the central passage, a biasing member passage and a ramped surface, the OWC further comprising:
a pin roller received in each cavity; and
a biasing member received in each biasing member passage, each biasing member applying a biasing force on an associated pin roller, wherein the biasing force on an associated pin roller forces the associated pin roller on the ramped surface of the cavity so that a portion of the pin roller extends out of an associated pin roller opening thereby engaging the post to prevent rotation of the OWC in relation to the post in a first direction and further wherein the associated pin roller is retained within the cavity to allow rotation of the OWC in relation to the post in a second direction.

6. The primary clutch assembly of claim 5, wherein the OWC further comprises:
a first plain bearing defining a first opening of the central passage proximate the first side of the OWC;
a second plain bearing defining a second opening of the central passage proximate the second side of the OWC, the pin roller openings in the passage being positioned between the first plain bearing and the second plain bearing.

7. The primary clutch assembly of claim 1, further comprising:
a first bearing positioned between the post and the sleeve coupler to allow rotation between the post and the sleeve coupler.

8. The primary clutch assembly of claim 7, further comprising:
a second bearing positioned between the sleeve coupler and the second sheave portion.

9. The primary clutch assembly of claim 1, further comprising:
the second sheave portion having a first side and a second side, the first side including the second conical-faced surface;
a cover coupled to the second side of the second sheave portion;

a spider having a first side, a second side and a central spider passage mounted to the post, the spider positioned between the second sheave portion and the cover;
a biasing member positioned between the cover and the spider to assert a biasing force; and
a sheave moving member configured to counter the biasing force of the biasing member based on a rotation of the primary clutch beyond a select rotational speed to move the second sheave portion axially in relation to the first sheave portion.

10. The primary clutch assembly of claim 9, wherein the sheave moving member further comprises:
a plurality of flyweights rotationally coupled the second side of the second sheave portion, the plurality of flyweights configured to exert a push force on the spider to counter the biasing force in response to a rotational speed of the primary clutch beyond the select rotational speed.

11. The primary clutch assembly of claim 1, wherein the engine braking assembly further comprises:
the second sheave portion having a first side and a second side, the second conical-faced surface position on the first side of the second sheave portion;
a braking ramp rim extending around an opening to the central passage on the second side of the second sheave portion, the braking ramp rim varying in height from the second side of the second sheave portion;
a one way clutch (OWC) rotationally mounted on the sleeve coupler, the OWC configured to rotate independent of the rotation of the sleeve coupler in one direction and lock on to the rotation of the sleeve coupler in another direction, the OWC having a plurality of bores; and
a plurality of torque buttons, a portion of each torque button received in a respective bore of the OWC, each torque button having an end configured to engage at least a portion of the braking ramp to selectively move the second sheave portion towards the first sheave portion when the OWC locks on the sleeve coupler.

12. The primary clutch assembly of claim 11, further comprising:
at least one return biasing member configured to return the OWC to a non-engine braking position when the OWC is no longer locked on the sleeve coupler.

13. The primary clutch assembly of claim 11, wherein the sleeve coupler further includes at least one bearing positioned to engage the post.

14. A continuously variable transmission (CVT) comprising:
a primary clutch configured to receive a rotational output of an engine, the primary clutch including,
a first sheave portion having a first conical-faced surface, the first conical-faced surface configured to engage a first side face of a drive belt,
a post centrally extending from the first conical-faced surface, and
a second sheave portion having a central passage rotationally mounted on the post, the second sheave portion having a second conical-faced surface positioned to face the first conical-faced surface, the second conical-faced surface configured to engage a second side face of the drive belt;
an engine braking assembly including,
a cylindrical sleeve coupler rotationally mounted on a portion of the post of the first sheave portion proximate the first conical-faced surface, the sleeve coupler having a engaging surface configured to engage an inner face of the drive belt, the sleeve coupler further having a portion positioned between the post and the second sheave portion, and a one way clutch (OWC) in rotational communication with the post of the first sheave portion and the sleeve coupler, the OWC configured to cause the second sheave portion to move towards the first sheave portion when the sleeve coupler attempts to overrun the rotation of the post of the first sheave portion; and a second clutch, the secondary clutch including,
a secondary sheave system configured to engage the drive belt, the secondary sheave assembly configured to provide a rotational output to a drive train.

15. The CVT of claim 14, further comprising:

a cylindrical ramp coupler having a first end and a second end, the ramp coupler rotationally mounted on the post of the first sheave portion, the first end of the ramp coupler rotationally coupled to the sleeve coupler, the second end of the ramp coupler having at least one coupler ramp; and the OWC rotationally mounted on the post of the first sheave portion, the OWC having at least one clutch ramp, the at least one clutch ramp positioned to engage the at least one coupler ramp of the ramp coupler, wherein rotational movement of the sleeve coupler in relation to the post rotates the at least one coupler ramp of the ramp coupler in relation to the at least one clutch ramp of the OWC causing the second sheave portion to move axially in relation to the first sheave portion.

16. The CVT of claim 14 further comprising:

the second sheave portion having a first side and a second side, the second conical-faced surface position on the first side of the second sheave portion;

a braking ramp rim extending around an opening to the central passage on the second side of the second sheave portion, the braking ramp rim varying in height from the second side of the second sheave portion;

the OWC rotationally mounted on the sleeve coupler, the OWC configured to rotate independent of the rotation of the sleeve coupler in one direction and lock on to the rotation of the sleeve coupler in another direction, the OWC having at least one bore; and at least one torque button, a portion of the at least one torque button received in the at least one bore of the OWC, the at least one torque button having an end configured to engage at least a portion of the braking ramp to selectively move the second sheave portion towards the first sheave portion when the OWC locks on the sleeve coupler.

17. The CVT of claim 14, wherein the primary clutch further comprises:

the second sheave portion having a first side and a second side, the first side including the second conical-faced surface;

a cover coupled to the second side of the second sheave portion;

a spider having a first side, a second side and a central spider passage mounted to the post, the spider positioned between the second sheave portion and the cover;

a biasing member positioned between the cover and the spider to assert a biasing force; and a sheave moving member configured to counter the biasing force of the biasing member pivot based on a rotation of the primary clutch beyond a select rotational speed to move the second sheave portion axially in relation to the first sheave portion.

* * * * *